US006845416B1

(12) United States Patent
Chasmawala et al.

(10) Patent No.: US 6,845,416 B1
(45) Date of Patent: Jan. 18, 2005

(54) SYSTEM AND METHOD FOR INTERFACING A CAN DEVICE AND A PERIPHERAL DEVICE

(75) Inventors: Zaki Chasmawala, Austin, TX (US); William R. Pitts, Round Rock, TX (US); Rodney W. Cummings, Austin, TX (US); James W. Edwards, Austin, TX (US)

(73) Assignee: National Instruments Corporation, Austin, TX (US)

( * ) Notice: Subject to any disclaimer, the term of this patent is extended or adjusted under 35 U.S.C. 154(b) by 672 days.

(21) Appl. No.: 09/630,844

(22) Filed: Aug. 2, 2000

(51) Int. Cl.$^7$ ............................................. G06F 13/00
(52) U.S. Cl. ....................... 710/107; 710/305; 713/400
(58) Field of Search ................... 710/305–315, 710/107; 713/400; 714/39

(56) References Cited

U.S. PATENT DOCUMENTS

| | | | |
|---|---|---|---|
| 5,446,846 A | | 8/1995 | Lennartsson |
| 6,208,919 B1 | * | 3/2001 | Barkesseh et al. ............. 701/35 |
| 6,282,673 B1 | * | 8/2001 | Liu et al. ...................... 714/25 |
| 6,467,052 B1 | * | 10/2002 | Kaler et al. .................... 714/39 |
| 6,598,107 B1 | * | 7/2003 | von der Wense et al. ... 710/305 |
| 6,611,724 B1 | * | 8/2003 | Buda et al. .................... 700/49 |
| 2002/0078381 A1 | * | 6/2002 | Farley et al. ................. 713/201 |
| 2003/0028701 A1 | * | 2/2003 | Rao et al. .................... 710/305 |

OTHER PUBLICATIONS

Siemens, "Controller Area Network: Fundamentals" Canpres Version 2.0, Oct. 1998 (http://www.infineon.com/cmc_upload/migrated_files/Application_Notes/CANPRE-S.pdf).*
Pinto, J, "Networked, intelligent I/O, the truly distributed control revolution," ISA Proceedings '94, rev. Dec. 1999.*
National Instruments, Application Note 162, "Synchronizing Motion, Vision, and Data Acquisition", Jun. 2000.
National Instruments, Application Note 128, "Advanced Synchronizing Techniques for Data Acquisition", Oct. 1998.
National Instruments, Application Note 129, "Tips and Techniques in DAQ Triggering", Oct. 1998.
National Instruments, Application Note 007, "Data Acquisition (DAQ) Fundamentals", Aug. 1999.
National Instruments, Measurement and Automation Catalogue, p. 305 and 806–829, 1999.
Pratico E R et al.: "A microcomputer–based 1–42 data acquisition system for transient network analyzer operation" Power Industry Compauter Applicaton Confrence, 1993. Conference Proceedings Scottsdale, AZ, USE May 4–7, 1993, New York, NY, USA, IEEE, US, May 4, 1993 (pp. 41–47.
European Search Report; EP 00 12 6588; Mailed Jul. 29, 2003.

* cited by examiner

Primary Examiner—Knanh Dang
Assistant Examiner—Clifford Knoll
(74) Attorney, Agent, or Firm—Meyertons Hood Kivlin Kowert & Goetzel, P.C.; Jeffrey C. Hood

(57) ABSTRACT

A system for interfacing a host computer to a Controller Area Network (CAN) bus. The system comprises a memory, an embedded processor and interface logic. The memory stores program code. The embedded processor couples to the memory and executes the program code. The interface logic interfaces the embedded processor with an interconnecting bus, e.g., the Real-Time System Integration (RTSI) bus. In response to execution of the program code, the embedded processor is operable to perform a CAN event in response to the interface logic receiving a RTSI trigger signal on a selected line of the RTSI bus. A peripheral device also coupled to the host computer assert the trigger signal in response to the peripheral device receiving and/or transmitting data. Furthermore, the interface logic is configured to assert a RTSI trigger signal on a selected line of said RTSI bus in response to the embedded processor performing a CAN event. CAN events include transmission/reception of a CAN frame. The peripheral device may be configured to perform a data transfer in response to receiving the trigger signal.

47 Claims, 15 Drawing Sheets

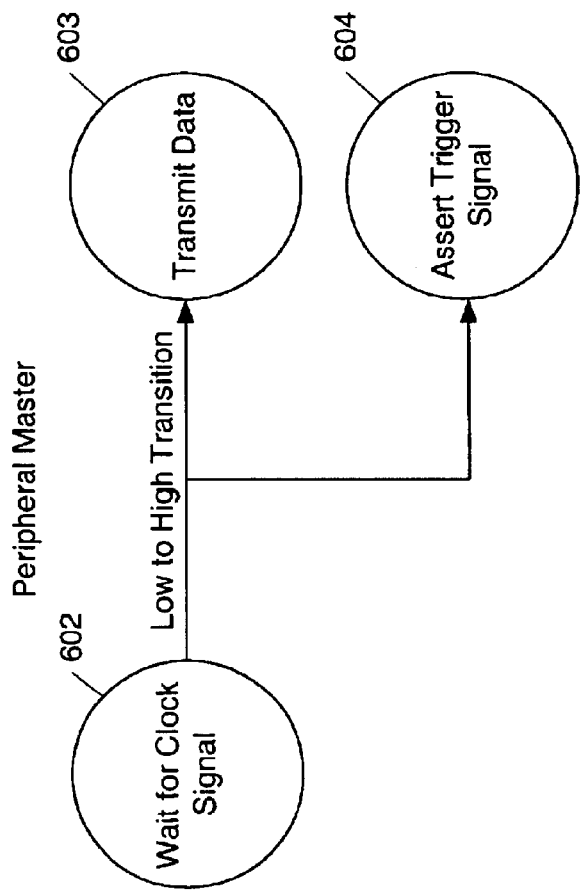
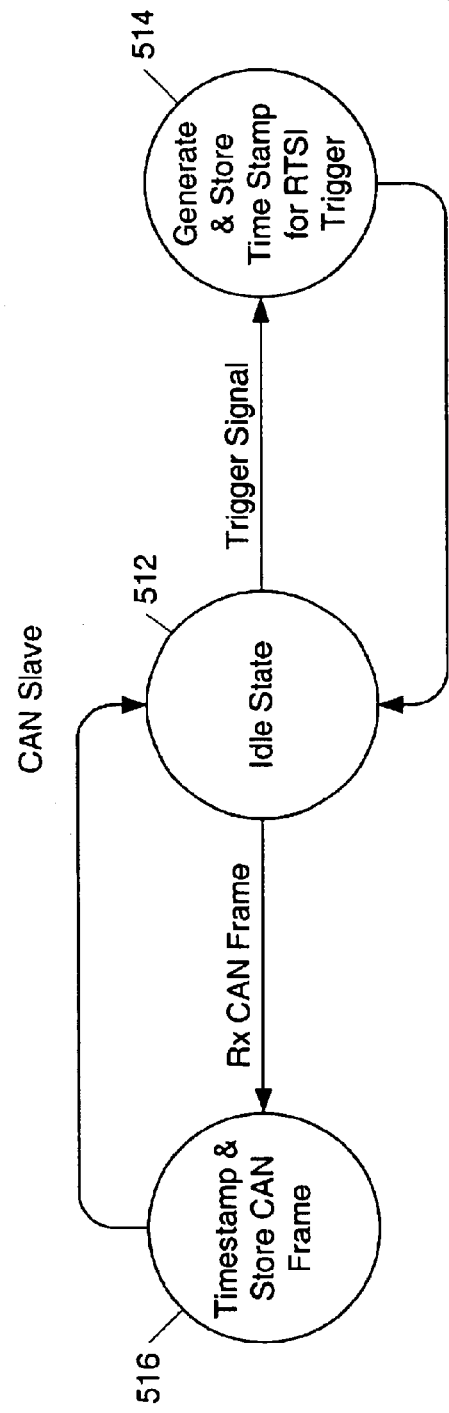
Fig. 9A
Fig. 9B

SYSTEM AND METHOD FOR INTERFACING A CAN DEVICE AND A PERIPHERAL DEVICE

FIELD OF THE INVENTION

The present invention relates to interfacing a Controller Area Network (CAN) and one or more peripheral devices for improved synchronization of events between the devices.

DESCRIPTION OF THE RELATED ART

A common problem with many peripheral devices and boards is that they do not easily lend themselves to the synchronization of functions across multiple boards. It would be desirable to perform a transfer/processing operation in one device or board in response to a transfer/processing event in a second device or board. If host software is the medium by which this synchronization is to occur, an indeterminate time is interposed between the event stimulus in the first board and the operational response in the second board because of the pseudo-random nature in which the host operating system manages processing tasks.

National Instruments Corporation has developed an inter-board signaling mechanism referred to as the Real-Time System Integration (RTSI) bus. Peripheral boards which offer RTSI support are able to perform inter-board synchronization.

In recent years, the need for improvements in automotive technology has led to increased usage of electronic control systems for functions such as engine timing, antilock brake systems, and distributorless ignition. With conventional wiring, data is exchanged in these systems using dedicated signal lines. As the complexity and number of devices has increased, usage of dedicated signal lines has become increasingly difficult and expensive.

To overcome the limitations of conventional automotive wiring, Bosch developed the Controller Area Network (CAN) in the mid-1980s. Using the Controller Area Network, devices (controllers, sensors, and actuators) are connected on a common serial bus. This network of devices may be thought of as a scaled down, real-time, low cost version of networks used to connect personal computers. Any device on a CAN network can communicate with any other device using a common pair of wires.

Recent advances in test applications, in the automotive industry for example, have demanded tighter integration of measurements between CAN devices and other devices such as data acquisition (DAQ) devices. It is desirable that the physical quantities measured by CAN and DAQ devices be measured substantially synchronously (i.e. close together in time) to correlate the data between them. This synchronization can be done in software. However, as mentioned above the latency of the operating system and other software in the computer system introduces delays that may not be acceptable for some test applications.

Currently existing CAN devices typically do not provide an efficient mechanism for inter-board synchronization. For example, prior art CAN devices are not known to provide support for RTSI bus communication. Thus, there exists a substantial need for a CAN device (e.g. an CAN interface board) which supports a fast and efficient mechanism for inter-board synchronization of events. It is further desirable to provide improved methods for synchronizing CAN bus activity with the activity of other devices which are used in acquiring signals from, and/or providing signals to, a unit under test.

SUMMARY OF THE INVENTION

One embodiment of the present invention comprises a system for operating a Controller Area Network (CAN) interface. The system may comprise the CAN interface and a peripheral device (e.g. a data acquisition device, a waveform generator, a signal conditioning module, etc.), where both the CAN interface and peripheral device may be coupled to a host computer, e.g. to a peripheral bus of the host computer. The CAN interface may couple through a CAN bus to CAN devices, which in turn may be coupled to a physical system or unit under test (UUT). The peripheral device may also be coupled through one or more sensors and/or actuators to the physical system. The CAN interface and peripheral device are directly coupled by an interconnecting bus, such as the Real-Time System Integration (RTSI) bus.

The CAN interface preferably comprises a memory, an embedded processor, bus interface logic, and CAN interface logic. The memory may store program code, and the embedded processor couples to the memory and executes the program code. The bus interface logic interfaces the CAN interface with the interconnecting bus, wherein the CAN interface and the peripheral device may communicate with each other through the interconnecting bus.

The peripheral device may be operable to assert a trigger signal on a selected line of the interconnecting bus in response to processing/transfer event occurring in the peripheral device. For example, the peripheral device may assert the trigger signal in response to the transmission (or initiation of transmission) of analog and/or digital signals to an external device or physical system. Conversely, the peripheral device may assert the trigger signal in response reception (or the initiation of reception) of analog and/or digital signals from an external device or physical system. The embedded processor may be operable to perform a CAN event in response to the bus interface logic receiving the trigger signal on the selected line of the interconnecting bus. In this case, CAN events may include the transmission of a CAN frame, and/or the generation and storage of a trigger timestamp defining a time-of-occurrence of the trigger signal.

Furthermore, the CAN interface may be configured to assert a trigger signal on a selected line of the interconnecting bus in response to the CAN interface, e.g., the embedded processor in the CAN interface, performing a CAN event. In this case, the CAN event may comprise transmission of a CAN frame, reception of a CAN frame, reception of an indication that a user application program (running on the host computer) has called a particular CAN function, or any combination thereof. In response to receiving the trigger signal on the selected line of the interconnecting bus, the peripheral device may perform a processing and/or transfer event. For example, the peripheral device may initiate a signal transmission and/or a signal reception in response to the trigger signal.

Thus the CAN interface and the peripheral device are operable to synchronize operations through use of the interconnecting bus. This allows improved measurement and control operations in measuring and/or controlling the physical system.

BRIEF DESCRIPTION OF THE DRAWINGS

Other objects and advantages of the invention will become apparent upon reading the following detailed description and upon reference to the accompanying drawings in which:

FIGS. 9A and 9B illustrate a second configuration of the computer-based control system 100, wherein CAN interface 104 generates and stores a RTSI timestamp in response to the transmission of data by peripheral device 106;

Figure 1:
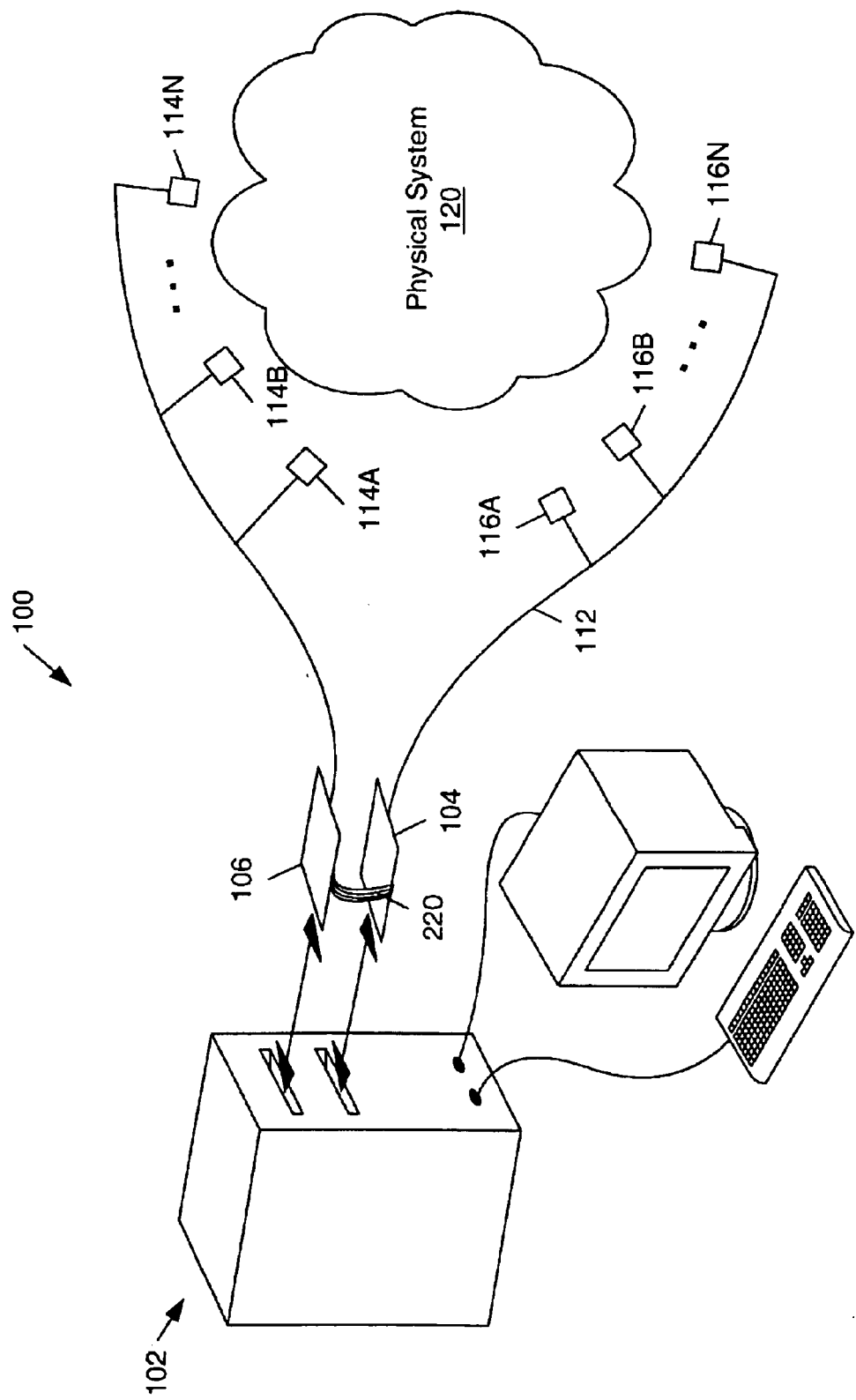
FIG. 1 illustrates one embodiment of a computer-based control, measurement and/or analysis system 100.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

FIG. 1—Exemplary Computer-Based Control System

FIG. 1 illustrates one embodiment of an exemplary computer-based control system 100 according to the present invention. The computer-based control system 100 may comprise a host computer 102 coupled to a controller area network (CAN) interface 104 and a peripheral device 106. Host computer 102 may be a personal computer, a notebook computer, a workstation, a minicomputer, etc., i.e. any of a variety of computer devices. Further computer-based control system 100 may be a PXI or VXI system wherein the host computer 102 is implemented on a modular card. The computer-based control system 100 may be implemented in other form factors.

CAN interface 104 couples to a controller area network (CAN) bus 112. One or more CAN devices 116A-N may be connected to the CAN bus 112. A CAN device may represent a sensor, an actuator, or a group of sensors and/or actuators. CAN interface 104 and the CAN devices 116A-N exchange data through the CAN bus 112 by means of packets which are commonly referred to as CAN frames.

CAN devices 116A-N interact with a physical system or unit under test (UUT) 120, i.e. receive physical signals from physical system 120 and/or assert physical signals into/onto/through physical system 120. Thus, devices 116A-N may be positioned proximate to physical system 120.

Physical system 120 may represent any physical system which is desired to be controlled, measured, analyzed, etc., or a combination of such physical systems. In one application, the physical system is automobile related. For example, the physical system 120 may be an automobile brake system, ignition system, fuel system, air conditioning system, etc., or a combination thereof. In one embodiment, the physical system 120 may represent a unit under test (UUT).

CAN interface 104 may comprise an adapter card (or board) configured for insertion in a slot of computer 102. Thus, CAN interface 104 may be referred to herein as the CAN adapter card 104. CAN adapter card 104 is shown external to the computer system 102 for illustrative purposes. In other embodiments, CAN interface 104 may be an external device coupled to the host computer 102.

Peripheral device 106 may be any of various types of devices which are configured to receive and/or transmit digital and/or analog signals. For example, peripheral device 106 may be a general-purpose data acquisition device, an image acquisition device, a motion control device, or a waveform generator that supports an interconnecting bus. In one embodiment, peripheral device 106 may be a second CAN interface similar to CAN interface 104. In other embodiments, peripheral device 106 does not support the CAN protocol.

As shown, peripheral device 106 may be coupled to one or more sensors and/or actuators 114A-N. Sensors/actuators 114A-N may be located proximate to physical system 120 to receive/assert physical signals from/to physical system 120.

Peripheral device 106 may also be an adapter card or board configured for insertion in a slot of the computer 102. However, as with the CAN interface 104, peripheral device 106 is shown external to the computer system 102 for illustrative purposes. In an alternative embodiment, peripheral device 106 may be an external device coupled to the host computer 102.

As noted above, in alternate embodiments, the computer-based control system of the present invention may have various different forms or architectures. For example, the computer-based control system may be implemented using a PXI (PCI extensions for instrumentation) chassis, where CAN interface 104 and peripheral device 106 are PXI cards comprised in the chassis. In this embodiment, the PXI chassis may also include a computer system configured on a card which is comprised in the chassis. Alternatively, a separate computer system may couple to the PXI chassis for controlling the system. Various other implementations are contemplated, such as a VXI system, a VME system or other system.

As discussed further below, CAN interface 104 and peripheral device 106 are coupled through an interconnecting bus (e.g. a Real-Time System Integration bus), thereby enabling substantially real-time communication between them. The interconnecting bus enables the CAN interface 104 and peripheral device 106 to send synchronizing (i.e. trigger) signals to each other, and thus, supports the synchronization of the data processing/transfer activities of CAN interface 104 and peripheral device 106.

CAN Bus Communication

When a CAN device transmits data onto CAN bus 112, an identifier (which is unique so far as the network comprised by CAN bus 112 is concerned) precedes the data. The identifier defines not only the transmitting CAN device, but also the priority of the transmission.

When a CAN device transmits a message onto the CAN bus 112, all other CAN devices receive that message. Each CAN device performs an acceptance test on the identifier to determine if the message is relevant to it. If the received message is not relevant to a CAN device, the CAN agent may simply ignore the message.

When more than one CAN device transmits a message simultaneously, the identifier is used as a priority to determine which device gains mastery of the CAN bus 112. In the preferred embodiment, the lower the numerical value of the identifier, the higher its priority. (A wide variety of mappings between priority and identifier values are contemplated).

As each device transmits the bits of its identifier, it listens to the CAN bus 112 to determine if a higher-priority identifier is being transmitted simultaneously. If an identifier collision is detected, the losing device(s) immediately cease transmission, and wait for the higher-priority message to complete before automatically retrying. Because the highest priority identifier continues its transmission without interruption, this scheme is referred to as nondestructive bitwise arbitration, and CAN's identifier is often referred to as an arbitration ID.

The messages transferred across CAN bus 112 are commonly referred to as CAN frames. The CAN protocol supports two frame formats as defined in the Bosch version 2.0 specifications. The essential difference between the two frame formats is in the length of the arbitration ID. In the standard frame format (also known as 2.0A), the length of the arbitration ID is 11 bits. In the extended frame format (also known as 2.0B), the length of the arbitration ID is 29 bits.

User application programs stored in host computer 102 may control/manipulate/analyze/observe physical system 120 through CAN interface 104 and/or peripheral device 106. In order to support user software interaction with CAN interface 104 and peripheral device 106, host computer 102 may store one or more software programs, e.g., dynamic link libraries (DLLs) comprising functions which are callable by the user application programs. The DLL functions may call kernel level driver routines which more directly interact with CAN interface 104 and/or peripherals such as peripheral device 106.

In the preferred embodiment, CAN interface 104 includes an embedded processor and memory. Host computer 102 may download program code and/or data to the embedded memory. The embedded processor executes the program code and operates on the data stored in the embedded memory.

Figure 3:
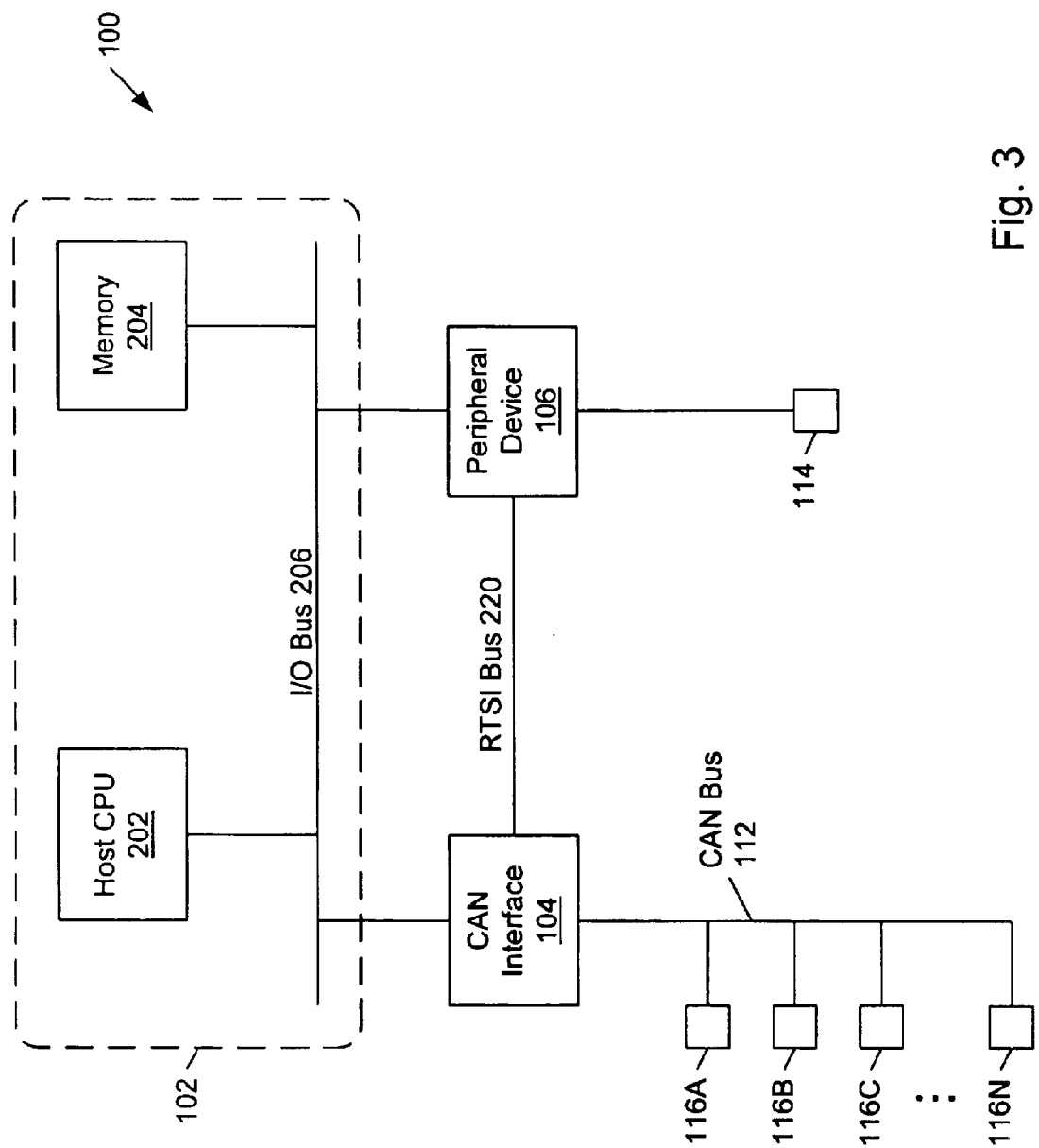
FIG. 3 illustrates a hierarchical model for CAN communication based on objects.

FIG. 3—System Architecture

FIG. 3 illustrates a simplified architecture for the computer-based control system 100 of FIG. 1, and various elements not necessary to an understanding of the present invention have been eliminated for simplicity. As shown, host computer 102 may comprise a host CPU 202 which couples to a memory 204. Host CPU 202 and memory 204 may couple to each other through a host or memory bus (now shown) which in turn may couple to an I/O bus 206. I/O bus 206 may be the PCI expansion bus, an ISA bus, or any other type of I/O bus. CAN interface 104 and peripheral device 106 may both be coupled to I/O bus 206 as shown.

Memory 204 preferably stores software for controlling the computer-based control system 100. The software is executable by host CPU 202 to control operation of peripheral devices such as CAN interface 104 and peripheral device 106.

CAN interface 104 couples to peripheral device 106 through an interconnecting bus 220. The interconnecting bus 220 provides a direct connection between CAN interface 104 and peripheral device 106. In the preferred embodiment, the interconnecting bus 220 is the Real-Time System Integration (RTSI) bus. In various embodiments which follow, the interconnecting bus 220 is realized by the RTSI bus. However, various inter-connecting buses may be used instead of (or in conjunction with) the RTSI bus.

CAN interface 104 uses the RTSI bus to provide inter-board synchronization of data processing/transfer events. For example, CAN interface 104 may perform a processing/transfer event in response to a trigger signal (e.g. synchronization signal) received from peripheral device 106 through the RTSI bus 220. Conversely, CAN interface 104 may assert a trigger signal on RTSI bus 220 which is received by peripheral device 106. The trigger signal invokes a processing/transfer event in peripheral device 106. It is assumed that peripheral device 106 also provides support for RTSI communication. RTSI bus 220 routes timing and trigger signals between CAN interface 104 and other boards such as peripheral device 106.

CAN interface 104 also couples to CAN bus 112. As noted above, CAN bus 112 may couple to one or more sensors and/or actuators 116A-N, and peripheral device 106 may also couple to one or more sensors and/or actuators 114.

In one set of embodiments, the RTSI bus connection 220 between CAN interface 104 and peripheral device 106 may be implemented by ribbon cable. In a second set of embodiments, the RTSI bus connection 220 may be realized as part of a back plane connection provided by a chassis (e.g. PXI chassis) in which the CAN interface 104 is inserted. In various embodiments, any of a variety of connectivity technologies may be used to implement the RTSI bus connection 220.

The RTSI bus 220 allows the user to synchronize CAN interface 104 with multiple other boards/cards/devices such as peripheral device 106 which are coupled to host IQ computer 102. The RTSI bus 220 can also synchronize CAN bus events between multiple CAN boards. For example, in one embodiment, peripheral device 106 may be a CAN board similar to CAN interface 104. The RTSI bus 220 may comprise a plurality of trigger lines. The trigger lines provide a flexible scheme for exchanging trigger signals (i.e. synchronization signals) between boards.

CAN interface 104 is equipped with RTSI bus logic that supports the transmission and/or reception of timing/trigger signals to/from other peripheral devices such as device 106. CAN interface 104 may be configured to drive (i.e. assert) a timing/trigger signal on a selected one of the RTSI trigger lines. In this case, CAN interface 104 is said to be a "master" of the selected trigger line. The agent (e.g. peripheral device 106) which receives the timing/trigger signal is referred to as a "slave" with respect to the selected trigger line.

Conversely, CAN interface 104 may be configured to receive a timing/trigger signal asserted by peripheral device 106 on a selected one of the RTSI trigger lines. In this case, CAN interface 104 is the slave and peripheral device 106 is the master of the selected trigger line. It is noted that CAN interface 106 may be RTSI master with respect to a first set of one or more trigger lines, and a RTSI slave with respect to a second set of one or more trigger lines.

In one embodiment, CAN software in computer-based control system 100 and CAN interface 104 uses an object-oriented model to specify the properties of CAN bus communication. In object-oriented terminology, the term class describes a classification of an object, and the term instance refers to a specific instance of that object. The term object is generally used as a synonym for instance. For example, a class called the CAN Network Interface Object may be defined with sufficient generality to describe any network interface port on a CAN hardware product such as CAN interface 104. Specific instances of the CAN Network Interface Object may be referenced with names like CAN0 and CAN1. Each instance of a particular class has attributes that define its externally visible qualities, as well as methods that are used to perform actions. For example, each instance of the CAN Network Interface Object has an attribute for the baud rate (bits per second) used for communication on the corresponding CAN network, as well as a method used to transmit CAN frames onto the CAN network. CAN interface 104, CAN devices 116 and CAN bus 112 comprise an example of a CAN network.

Figure 2:
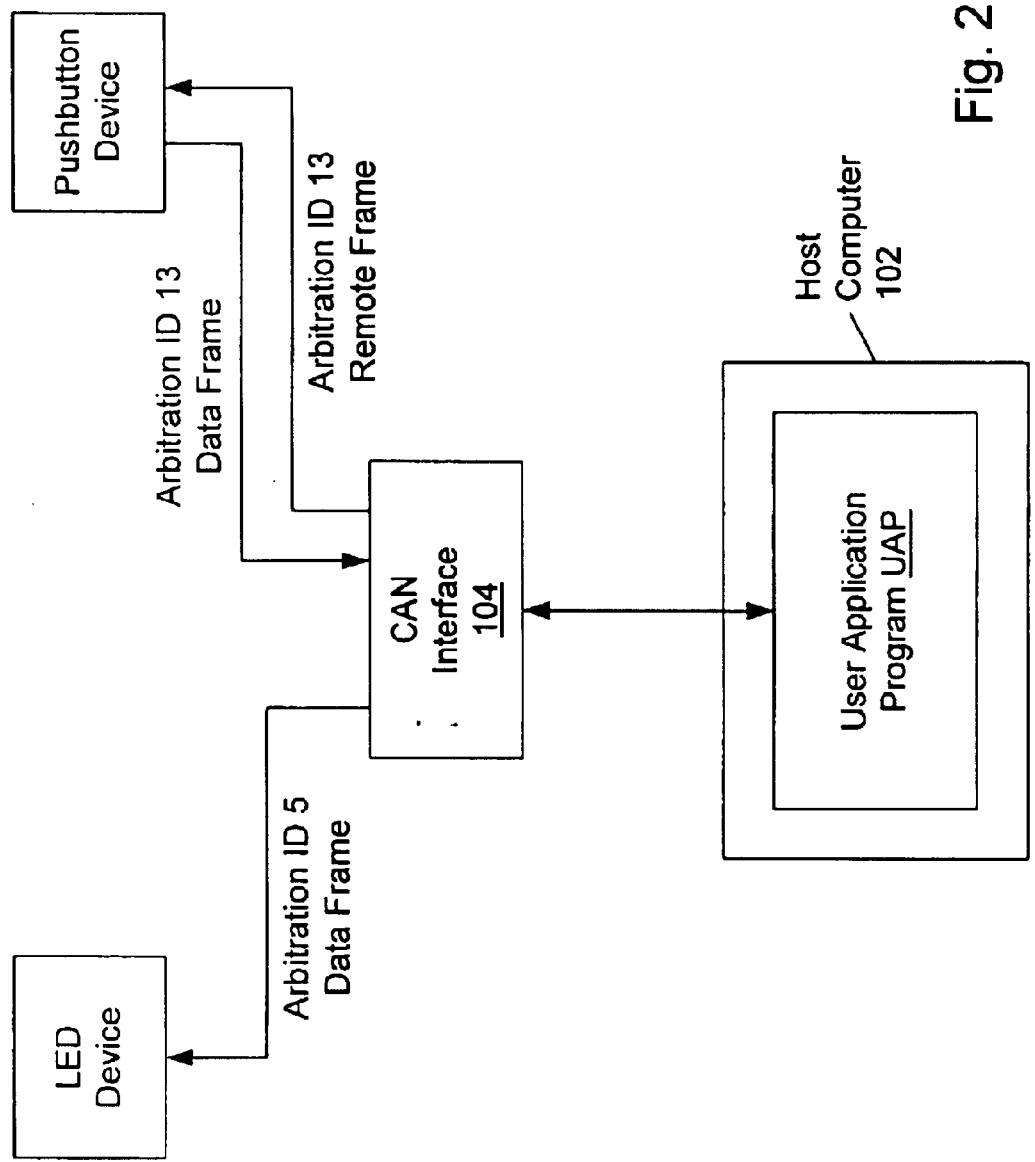
FIG. 2 illustrates one embodiment of CAN communication.

CAN network communication may be described in terms of a hierarchical collection of objects (instances), each of which has attributes and methods. The hierarchy implies relationships between various objects. In general, a given object in the hierarchy has an "is used to access" relationship with all objects above it in the hierarchy. As an example, consider a CAN device network in which CAN interface 112 is physically connected to two CAN devices, a pushbutton device and a light emitting diode device, as shown in FIG. 2. The pushbutton device transmits the state of the button in a CAN data frame with standard arbitration ID 13. The frame data consists of a single byte: zero if the button is off, one if the button is on. For the CAN interface 104 (and ultimately user application program UAP) to obtain the current state of the pushbutton, CAN interface 104 transmits a CAN remote frame with standard arbitration ID 13. The pushbutton device responds to this remote transmission request by transmitting the button state in a CAN data frame. The LED device expects to obtain the state of the LED from a CAN data frame with standard arbitration ID 5. It expects the frame data to consist of a single byte: zero to turn the light off, one to turn the light on.

FIG. 4—CAN Objects

Figure 4:
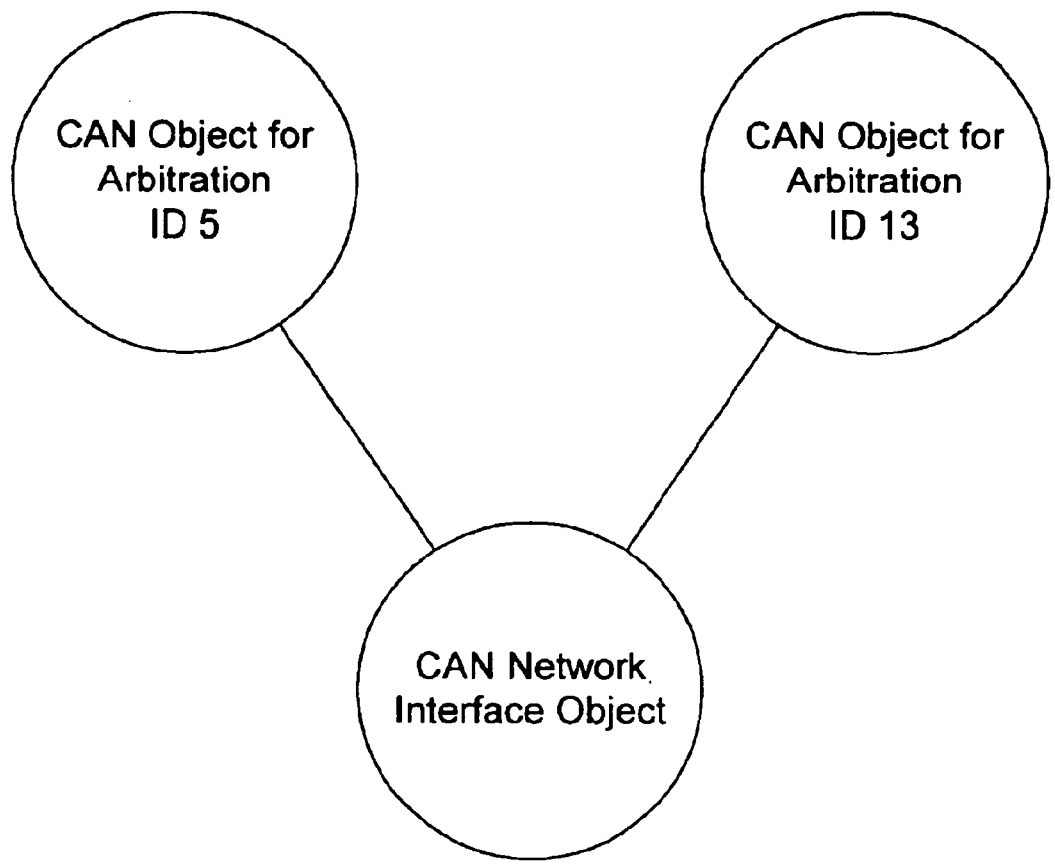
FIG. 4 is block diagram for one embodiment of computer-based control system 100.

FIG. 4 shows how CAN objects encapsulate access to the CAN network of FIG. 2. The circles of FIG. 3 indicate CAN objects. The CAN Network Interface Object encapsulates the entire CAN network interface. Its attributes are used to configure settings that apply to the network interface as a whole. For example, the CAN Network Interface Object contains an attribute that determines the baud rate that the network interface hardware (i.e. CAN interface 104) uses for communication. The CAN Network Interface Object is associated with functions that may be used to communicate on the CAN device network. For example, user application program UAP may call a transmit function to invoke the transmission of a CAN remote frame to the pushbutton device, and then, call the read function to retrieve the resulting CAN data frame (generated by the pushbutton device in response to the remote frame).

Because the CAN Network Interface Object provides direct access to the network interface, the write and read functions require all information about the CAN frame to be specified, including arbitration ID, whether the frame is a CAN data frame or a CAN remote frame, the number of data bytes, and the frame data (assuming a CAN data frame).

A CAN Object encapsulates a specific arbitration ID, along with its data In addition to providing the ability to transmit and receive frames for a specific arbitration ID, CAN Objects also provide various forms of background access. For example, a CAN Object may be configured for arbitration ID 13 (the pushbutton) to automatically transmit a CAN remote frame every 500 ms, and to store the data of the resulting CAN data frame for later retrieval. After the CAN Object is configured in this manner, the user application program UAP may call the read function to obtain a single data byte that holds the most recent state of the pushbutton.

In the preferred embodiment, the user may configure a CAN Object as a master or a slave of a particular trigger line of the RTSI bus 220. Also, the user may configure a CAN Network Interface Object as master or slave. In the preferred embodiment, memory 204 stores a configuration utility which assists the user in creating objects. The software attribute that configures the object as a Master or Slave is the RTSI Mode. The following values for the RTSI Mode are available in the preferred embodiment:

(1) Disable RTSI,
(2) On RTSI Input-Transmit CAN Frame,
(3) On RTSI Input-Timestamp RTSI event,
(4) RTSI Output on Receiving CAN Frame,
(5) RTSI Output on Transmitting CAN Frame, and (6) RTSI Output on ncAction call.

In mode (1), the given object does not use RTSI signaling, and all other RTSI configuration fields in the object are ignored. Modes (2) and (3) configure the object (i.e. CAN Network Interface Object or CAN Object) as a slave that takes some action in response to a trigger signal on a selected one of the RTSI trigger lines. The RTSI trigger line to be used by a given object is defined by the "RSTI Signal Attribute". Modes (4), (5) and (6) configure the object (i.e. CAN Network Interface Object or CAN Object) as a master. The operation of each RTSI mode will be explained in more detail below.

Figure 5:
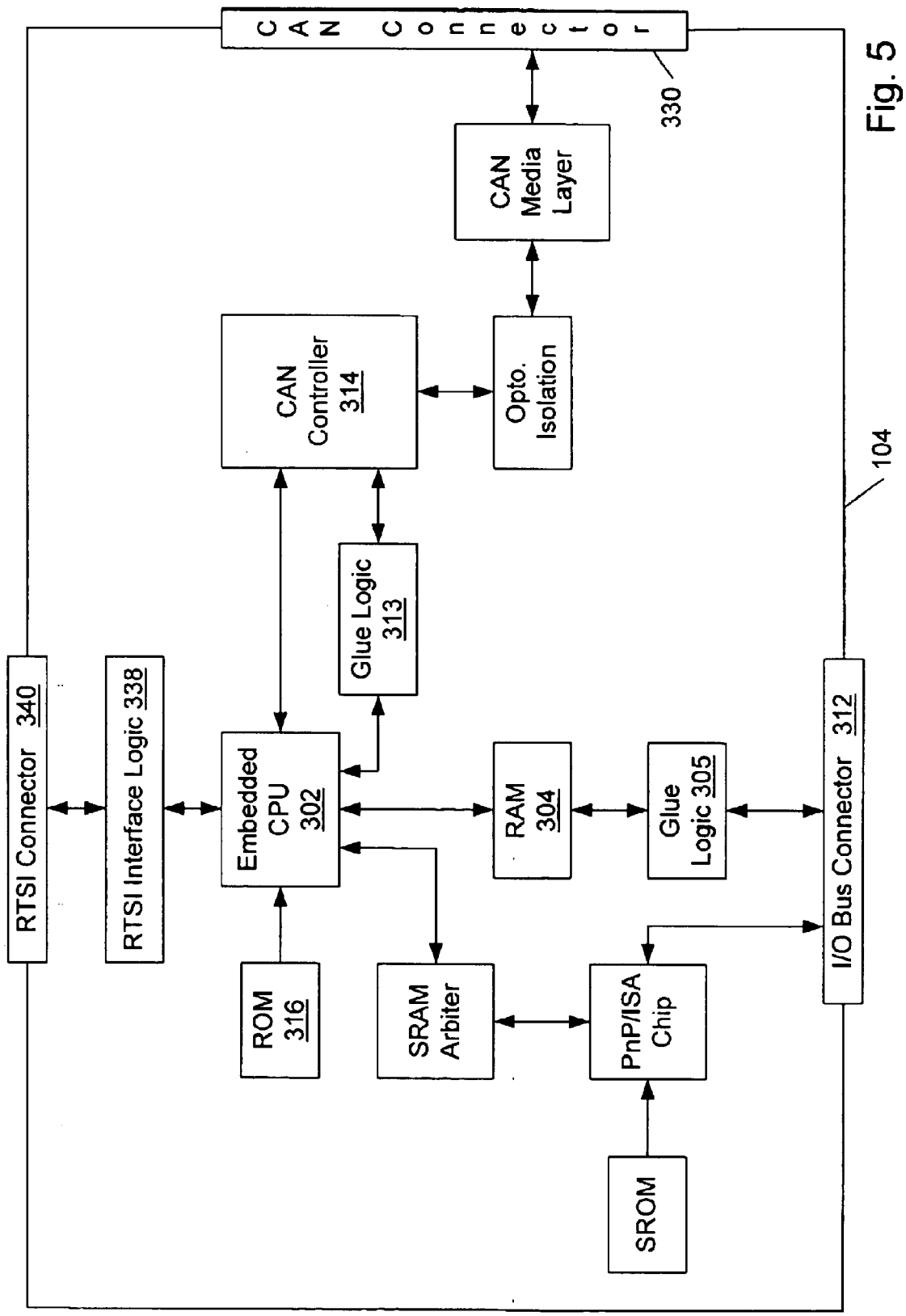
FIG. 5 illustrates one embodiment of CAN interface 104.

FIG. 5—CAN Interface Block Diagram

FIG. 5 illustrates one embodiment of CAN interface 104. As shown, CAN interface 104 includes an embedded CPU 302, random access memory 304 (e.g. SRAM), read only memory 316, and a CAN controller 314. In one embodiment, embedded CPU 302 is an Intel 80386EX microprocessor. However, it is noted that embedded CPU 302 may be realized by any of a variety of other processors. Host computer 102 may access CAN interface 104 through a dual access window in RAM 304.

Embedded CPU 302 executes embedded program code and operates on data structures stored in RAM 304 and/or ROM 316. In response to execution of the embedded program code, embedded CPU 302 is capable of monitoring, scanning and configuring CAN networks. The embedded program code may be downloaded from host computer 102 through the shared memory window.

Embedded CPU 302 allows the CAN interface 104 to operate independently of the host computer 102. Embedded CPU 302 also allows the CAN interface 104 to provide programmable assertion of CAN events in response to RTSI trigger signals, and vice versa, per CAN object.

CAN controller 314 may be connected to embedded CPU 302 as an I/O peripheral. CAN controller 314 may implement the low level of the CAN protocol. For example, CAN controller 314 converts the serial data from the CAN bus into byte wide data in packets.

An off-the-shelf integrated circuit may be used to implement the CAN media layer. For example, in one embodiment, the CAN media layer may be implemented by the Philips 82C200 chip. Optical isolation is provided between the CAN media layer and CAN controller 314. A CAN connector 330 provides for coupling the CAN interface 104 CAN bus 112. Glue logic 313 may be employed to match the timing of CAN controller 314 to the read and write cycle of the embedded CPU 302.

CAN interface 104 may communicate with host computer 102 through I/O bus 206. Thus, CAN interface 104 preferably includes an I/O bus connector 312 for coupling to I/O bus 206. Glue logic 305 may used to facilitate I/O bus access to RAM 304. Glue logic 305 may comprise data line and address buffers.

CAN interface 104 may include an arbiter (e.g. an SRAM arbiter) which controls I/O bus accesses to RAM 304. When the arbiter detects an I/O bus cycle to access RAM 304, the arbiter may hold off the I/O bus cycle using the IOCHRDY signal. The arbiter may then assert a HOLD signal to hold off the embedded CPU 302. The arbiter may then wait for the embedded CPU 302 to assert a HOLD Acknowledge signal. The arbiter may then allow the I/O cycle to complete. When the I/O cycle completes, the arbiter may release the HOLD signal to allow the embedded CPU 302 to continue. The arbiter may also control address and data buffers between RAM 304, the embedded CPU 302, and the I/O bus 206.

CAN interface 104 may be Plug-N-Play compatible. Thus, CAN interface 104 may include a PnP/Bus controller (e.g. the Fujitsu MB86701 PnP ISA controller) which handles memory address decoding for shared SRAM window and interrupt assignment and routing. CAN interface 104 may include SROM to hold the default configuration for the PnP/Bus controller, the PnP serial identifier, and the PnP resource requirements descriptor. The SROM may connect directly to the PnP/Bus controller.

ROM 316 may store the power-on self test and a monitor. The monitor may allow I/O accesses, memory accesses, software downloading and software startup. ROM 316 may connect directly to the embedded CPU 302. Embedded CPU 302 may include chip select generator configured to generate sufficient wait states to allow ROM 316 to meet the access timing requirements of the embedded CPU 302.

CAN interface 104 includes RTSI interface logic 338 and a RTSI connector 340. RTSI interface logic 338 may supports for RTSI signaling through RTSI bus 220 which couples to RTSI connector 340.

CAN Network Interface Objects

The CAN Network Interface Object encapsulates a physical interface to a CAN network (e.g. a CAN port on an AT or PCI interface). CAN Network Interface Objects are used to read and write complete CAN frames. As a CAN frame arrives from CAN bus 112, it may be placed into the read queue of the CAN Network Interface Object. The read queue may comprise a portion of RAM 304 in CAN interface 104. A user application (executing on host CPU 202) may retrieve CAN frames from this read queue using a function referred to herein as ncRead.

For CAN Network Interface Objects, the ncRead function returns a timestamp of when the frame was received, the arbitration ID of the frame, the type of frame (data or remote), the data length, and the data bytes. A user application may also use the CAN Network Interface Object to write CAN frames using another function referred to herein as ncWrite. Some possible uses for the CAN Network Interface Object include the following.

(1) The read queue may be used to log all CAN frames transferred across the CAN network bus 112. This log may be useful in situations where it is necessary to view preceding CAN traffic to verify that all CAN devices are functioning properly.

(2) The write queue may be used to transmit a sequence of CAN frames in quick succession. This is useful for applications in which a specific sequence of CAN frames are needed to verify proper device operation. The write queue may also comprise an allocated portion of RAM 304.

(3) CAN frames may be read or written for access to configuration settings within a device. Because such settings generally are not accessed during normal device operation, a dedicated CAN Object may not be appropriate.

(4) For higher level protocols based on CAN, sequences of write/read transactions may be used to initialize communication with a device. In these protocols, specific sequences of CAN frames often need to be exchanged before data may be accessed from a device. In such cases, the CAN Network Interface Object may be used to set up communication. CAN Objects may then be used for actual data transfer with the device.

In general, a CAN Network Interface Object may be used for situations in which arbitrary CAN frames need to be transferred.

Using CAN Objects

When a network frame is transmitted on a CAN based network, it begins with what is called the arbitration ID. The arbitration ID is primarily used for collision resolution when more than one frame is transmitted simultaneously. However, the arbitration ID may also be used as a simple mechanism to identify data. The CAN Object encapsulates a specific CAN arbitration ID and its associated data.

Every CAN Object may be associated with a specific CAN Network Interface Object which is used to identify the physical interface on which the CAN Object is located. The user application may use multiple CAN Objects in conjunction with their associated CAN Network Interface Object.

The CAN Object provides high level access to a specific arbitration D. Each CAN Object may be configured for different forms of background access. For example, a CAN Object may be configured to transmit a data frame every 100 milliseconds, or to periodically poll for data by transmitting a remote frame and receiving the data frame response. The arbitration ID, direction of data transfer, data length, and when data transfer occurs (periodic or unsolicited) are all preconfigured for the CAN Object. When the CAN Object has been configured and opened, data transfer is handled in the background using read and write queues. For example, if the CAN Object periodically polls for data, a CAN driver routine (executing on embedded CPU 302) automatically handles the periodic transmission of remote frames, and stores incoming data in the read queue of the CAN Object for later retrieval by the user application (using the ncRead function). The read queue of the CAN Object may be a portion of RAM 304.

For CAN Objects that receive data frames from the CAN network bus 112, the ncRead function returns a timestamp of when the data frame arrived, and the data bytes of the frame. In other words, the user application may call the ncRead function to retrieve a CAN data frame (with timestamp) which has been stored the read queue of the CAN Object.

For CAN Objects that transmit data frames onto the CAN network bus 112, the ncWrite function provides the data bytes which are to be transmitted. In other words, the user application may call the ncWrite function to deposit the data bytes in the write queue of the CAN Object. The embedded processor 302 automatically handles the transmission of a CAN frame with the corresponding arbitration ID and containing the data bytes onto CAN bus 112.

Some possible uses for CAN Objects include the following.

(1) A CAN Object may be configured to periodically transmit a data frame for a specific arbitration ID. The CAN Object transmits the same data bytes repetitively until different data is provided using ncWrite function. This configuration may be useful for simulation of a device that periodically transmits its data, such as simulation of an automotive sensor. This configuration may also be useful for devices that expect to periodically receive data for a particular arbitration ID so that they may respond with data using a different arbitration ID. A device containing analog inputs and outputs may exemplify such as device.

(2) A CAN Object may be configured to watch for unsolicited data frames received for its arbitration ID, then store that data in the CAN Object's read queue. A watchdog timeout is provided to ensure that incoming data is received periodically. This configuration may be useful when the user desires to apply a timeout to data received for a specific arbitration ID and store that data in a dedicated queue. If the user does not need to apply a timeout for a given arbitration ID, it is often preferable to use the CAN Network Interface Object to receive that data.

(3) A CAN Object may be used to periodically poll for data by transmitting a remote frame and receiving the data frame response. This configuration may be useful for communication with devices that require a remote frame to transmit their data.

(4) A CAN Object may be used to transmit a data frame whenever it receives a remote frame for its arbitration ID. This configuration may be used to simulate a device which responds to remote frames.

In general, CAN Objects may be used for data transfer for a specific arbitration ID, especially when that data transfer occurs periodically.

It is noted that the CAN driver routine executing on the embedded CPU 302 implements the transmission and/or reception functions for each CAN Object. Each CAN Object may have an associated read queue and/or write queue depending on the exact configuration of the CAN Object. The read queue and write queue may be portions of RAM 304 which are allocated when the CAN Object is created (or opened).

When embedded CPU 302 receives a CAN frame for a given arbitration ID, the CAN frame may be stored in the read queue of the corresponding CAN Object. The user application program may read the CAN frame from the read queue by calling the ncRead function. Conversely, the user application program may transfer data bytes to the write queue of a CAN Object. The embedded CPU 302 automatically reads the data bytes and transfers the data bytes in a CAN frame with corresponding arbitration ID onto CAN bus 112.

Figure 6:
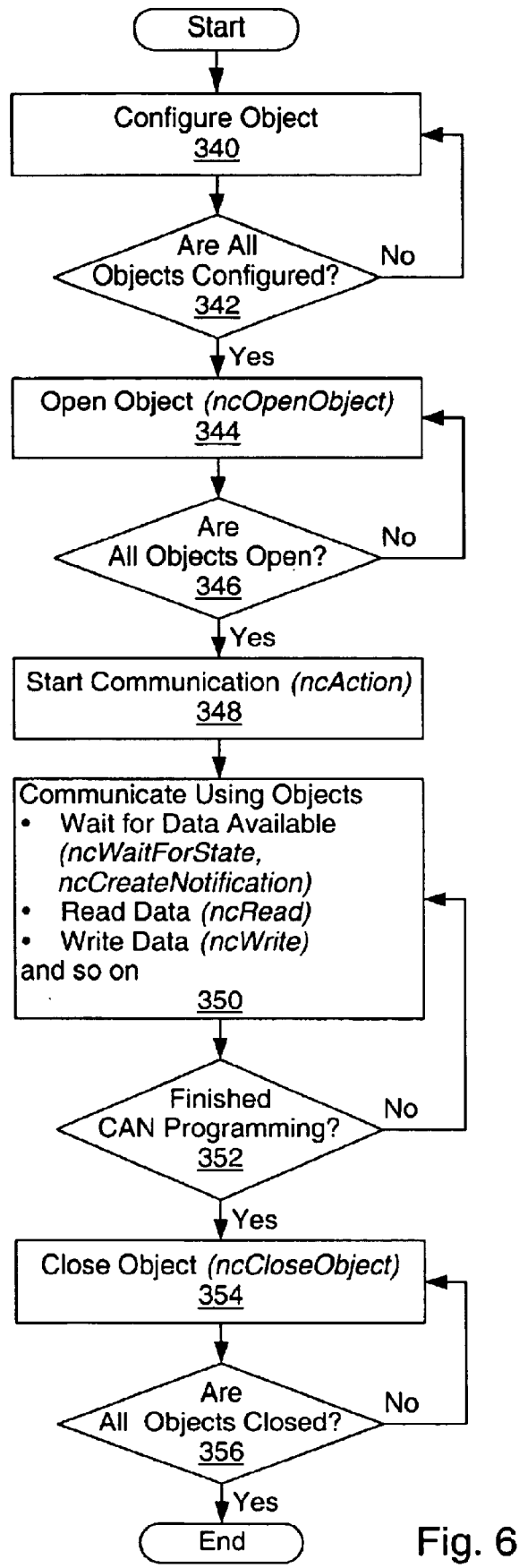
FIG. 6 illustrates a methodology by which user applications may operate with CAN objects (e.g. Network Interface Objects or CAN Objects)

The following steps demonstrate how the user application program may use various DLL functions. The steps are shown in FIG. 6 in flowchart form.

I. Configure Objects (Steps 340 and 342 of FIG. 6)

In the preferred embodiment, objects used by the user application program are configured and opened before being called by the user application program.

Prior to opening the objects, the objects are configured with their initial attribute settings. The objects may be configured in at least two ways:

(A) The configuration utility may be used to define objects and specify their configuration attributes. This method may be preferable, because it does not require configuration to be handled by the user application program.

(B) Each object may be configured within the user application by calling the ncConfig function. This function takes the name of the object to be configured, along with a list of configuration attribute settings.

In response to object configuration information received from the configuration utility and/or the user application program, the CAN driver routine executing on the embedded CPU 302 may configure one or more objects. For example, the CAN driver routine may allocate a read queue and/or write queue for each CAN Network Interface Object and each CAN Object.

II. Open Objects (Steps 344 and 346)

The ncOpenObject function is called to open each object to be used in the user application program. The ncOpenObject function returns a handle for use in all subsequent calls for that object.

III. Start Communication (Step 348)

Communication on the CAN network must be started before objects may be used to transfer data. If the CAN Network Interface Object is configured to start on open, then that object and all of its higher level CAN Objects are started automatically by the ncO-penObject function. In this case, no special action is required for this step.

If the start-on-open attribute of the CAN Network Interface Object has been disabled, then when the user application program is ready to start communication, it may use the CAN Network Interface Object to call the ncAction function with the Opcode parameter set to NC_OP_START. The ncAction call may be useful when the user desires to place outgoing data in write queues (via calls to the ncWrite function) prior to starting communication.

IV. Communicate Using Objects (Steps 350 and 352)

After objects are opened and communication has been started, data may be transferred on the CAN network using the ncRead and ncWrite functions. The manner in which data is transferred depends on the configuration of the objects which are being used. For example, assume that the user application program is to communicate with a CAN device that periodically transmits a data frame. To receive this data frame, assume that a CAN Object is configured to watch for data frames received for its arbitration ID and store that data in its read queue.

IVa. Wait for Available Data

To wait for the arrival of a data frame from a CAN device, the user application program may call the ncWaitForState function with the DesiredState parameter set to NC_ST_

READ_AVAIL. The NC_STREAD_AVAIL state implies that data for the CAN Object has been received from the CAN network bus 112 and placed into the object's read queue. Another way to wait for the NC_ST_READ_AVAIL state is to call the ncCreateNotification function so the user application program receives a callback when the state occurs.

When receiving data from the CAN device, if the only requirement is to obtain the most recent data, the user application program is not required to wait for the NC_ST_READ_AVAIL state. If this is the case, the read queue length of the CAN Object may be set to zero during configuration, so that it only holds the most recent data bytes. The user application program may then use the ncRead function as needed to obtain the most recent data bytes received.

IVb. Read Data

The data bytes in the read queue may be read using the ncRead function. For CAN Objects that receive data frames, ncRead returns a timestamp of when the data was received, followed by the actual data bytes (the number of which were configured in Step I above).

Steps IVa and IVb may be repeated for each data value when the user application program needs to read from a CAN device.

V. Close Objects (Steps 354 and 356)

When the user application program is finished accessing the CAN devices, all objects may be closed using the ncCloseObject function before the user application program exits.

RTSI Programming

The Real Time System Integration (RTSI) bus is a bus that interconnects National Instrument's DAQ, IMAQ, Motion and CAN boards. This feature allows synchronization of DAQ, IMAQ, Motion and CAN boards by allowing exchange of timing signals. Using RTSI, a device (e.g. board) can control one or more slave devices (boards). On PCI/AT boards, a user may use a ribbon cable for the connections. However, for PXI boards the connections are available on the back plane in the PXI chassis.

RTSI features of CAN interface 104 are configured via attributes in the CAN Network Interface Object and/or the CAN Object. In C, the configuration may be accomplished by adding new elements to the AttributeIdList and AttrValueList before calling the ncConfig function. In LabView, the configuration may be accomplished via the Network Interface configuration cluster or the CAN Object configuration cluster that has an optional input to wire a RTSI configuration cluster.

The following is a summary of the attributes and the possible values that these attributes can have.

Attribute NC ATTR RTSI MODE (RTSI Mode)

This attribute defines whether a CAN object is to be configured as a RTSI slave or a master. The following are the attribute values that can be used for this attribute:

| Attribute values in C | Attribute values in LabVIEW |
| --- | --- |
| (1) NC_RTSI_NONE | Disable RTSI |
| (2) NC_RTSI_TX_ON_IN | On RTSI Input - Transmit CAN Frame |
| (3) NC_RTSI_TIME_ON_IN | On RTSI Input - Timestamp RTSI event |
| (4) NC_RTSI_OUT_ON_RX | RTSI Output on Receiving CAN Frame |
| (5) NC_RTSI_OUT_ON_TX | RTSI Output on Transmitting CAN Frame |
| (6) NC_RTSI_OUT_ACTION_ONLY | RTSI Output on ncAction call |

(1) NC RTSI NONE (Disable RTSI)

This attribute value implies that RTSI is not needed for this Object. If the Object is set to this value, all other RTSI configuration is ignored.

(2) NC RTSI TX ON IN (On RTSI Input—Transmit CAN Frame)

The interpretation of this attribute may depend on whether the object is a CAN Network Interface Object or a CAN Object.

Network Interface. In this mode, the CAN driver routine executing on the embedded CPU 302 will transmit a CAN frame onto the CAN bus 112 in response to an incoming RTSI trigger on the RTSI line configured via the attribute NC_ATTR_RTSI_SIGNAL. The user application program writes frame data into the write queue of the object by calling the ncWrite function. The CAN driver routine transmits the most recent frame stored into the write queue. Transmission of a CAN frame from the write queue is initiated by a RTSI trigger signal received on the configured RTSI line. The CAN driver routine will retransmit the last frame until a new frame is en-queued by the user application program.

CAN Object: In this mode, a CAN frame corresponding to the CAN Object is transmitted on every incoming RTSI trigger (on the configured RTSI line).

Figure 7C:
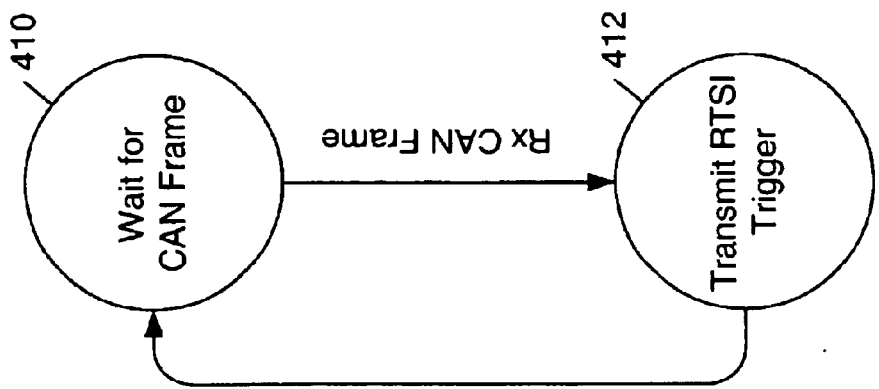
FIG. 7C illustrates an object configured to transmit a RTSI trigger signal in response to reception of a CAN frame.
Figure 7B:
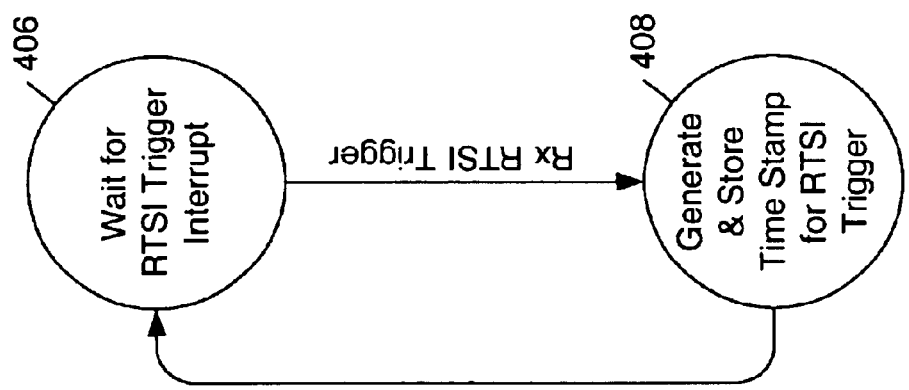
FIG. 7B illustrates an object configured to generate and store a RTSI timestamp in response to a RTSI trigger signal.
Figure 7A:
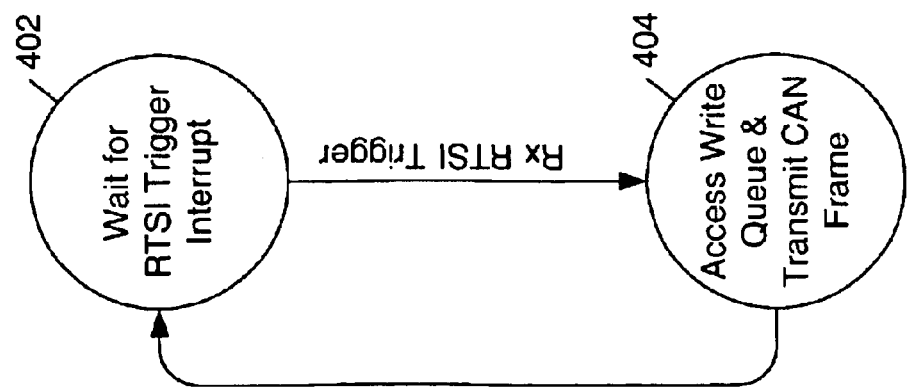
FIG. 7A illustrates an object configured to transmit a CAN frame in response to a RTSI trigger signal.

FIG. 7A illustrates operation of an object (Network Interface or CAN Object) configured with this attribute value (2). In state 402, the object (i.e. the CAN driver routine executing on the embedded CPU 302 in response to the object's configuration) waits for a RTSI trigger signal (interrupt) on the selected line of the RTSI bus 220. In response to the RTSI trigger, the object transitions to state 404. In state 404, the object accesses data bytes from the object's write queue, and composes and transmits a CAN frame containing the data bytes. After transmitting the CAN frame, the object returns to state 402.

(3) NC RTSI TIME ON IN

Network Interface: In this mode, CAN interface 104 will timestamp an incoming RTSI trigger on the RTSI line configured via NC_ATTR_RTSI_SIGNAL, and en-queue in the object's read queue a frame containing a special Arbitration ID (0x40000001) and the DLC field having the value of the RTSI line number that produced the RTSI event.

CAN Object: Since the CAN object's receiving structure contains only Timestamp and Data[8] field, a 4-byte data frame may be specified and embedded in the first four bytes of the Data[8] to assist the host software in distinguishing the RTSI event from other data frames. This 4-byte user frame may be configured via the attribute NC_ATTR_RTSI_FRAME in the RTSI configuration for the CAN object.

FIG. 7B illustrates operation of an object (Network Interface or CAN Object) configured with this attribute value (3). In state 406, the object (i.e. the CAN driver routine executing on the embedded CPU 302 in response to the object's configuration) waits for a RTSI trigger signal (interrupt) on the selected line of the RTSI bus 220. In response to the RTSI trigger, the object transitions to state 408. In state 408, the object generates a timestamp frame for the RTSI trigger signal and stores the timestamp frame in the read queue associated with the object. After storing the timestamp frame, the object may return to state 402.

In addition to timestamping RTSI trigger signals, the object may be configured to receive and/or transmit CAN frames from/to CAN bus 112. In one application scenario, an object is configured to read CAN frames in addition timestamping RTSI trigger signals. In this case, the user application program may read RTSI timestamps and CAN frames from the object's read queue (using the ncRead function), and may correlate the time occurrence of any given CAN frame to a corresponding one of the RTSI trigger signals.

(4) NC RTSI OUT ON RX

Network Interface & CAN Objects: In this mode, CAN interface 104 outputs a RTSI trigger on the RTSI line configured via NC_ATTR_RTSI_SIGNAL whenever a frame is en-queued in the read queue of that object. In other words, CAN interface 104 outputs a RTSI trigger when it receives a CAN frame corresponding to the CAN object from the CAN bus 112.

FIG. 7C illustrates operation of an object (Network Interface or CAN Object) configured with this attribute value (4). In state 410, the object (i.e. the CAN driver routine executing on the embedded CPU 302 in response to the object's configuration) waits for a CAN frame. In response to receiving a CAN frame, the object transitions to state 412. In state 412, the object transmits a RTSI trigger signal on a selected line of the RTSI bus 220. After transmitting the RTSI trigger signal, the object may return to state 410.

(5) NC RTSI OUT ON TX

Network Interface & CAN Objects: In this mode, CAN interface 104 outputs a RTSI trigger on the line configured via NC_ATTR_RTSI_SIGNAL whenever a frame corresponding to the object is successfully transmitted.

Figures 7D, 7E:
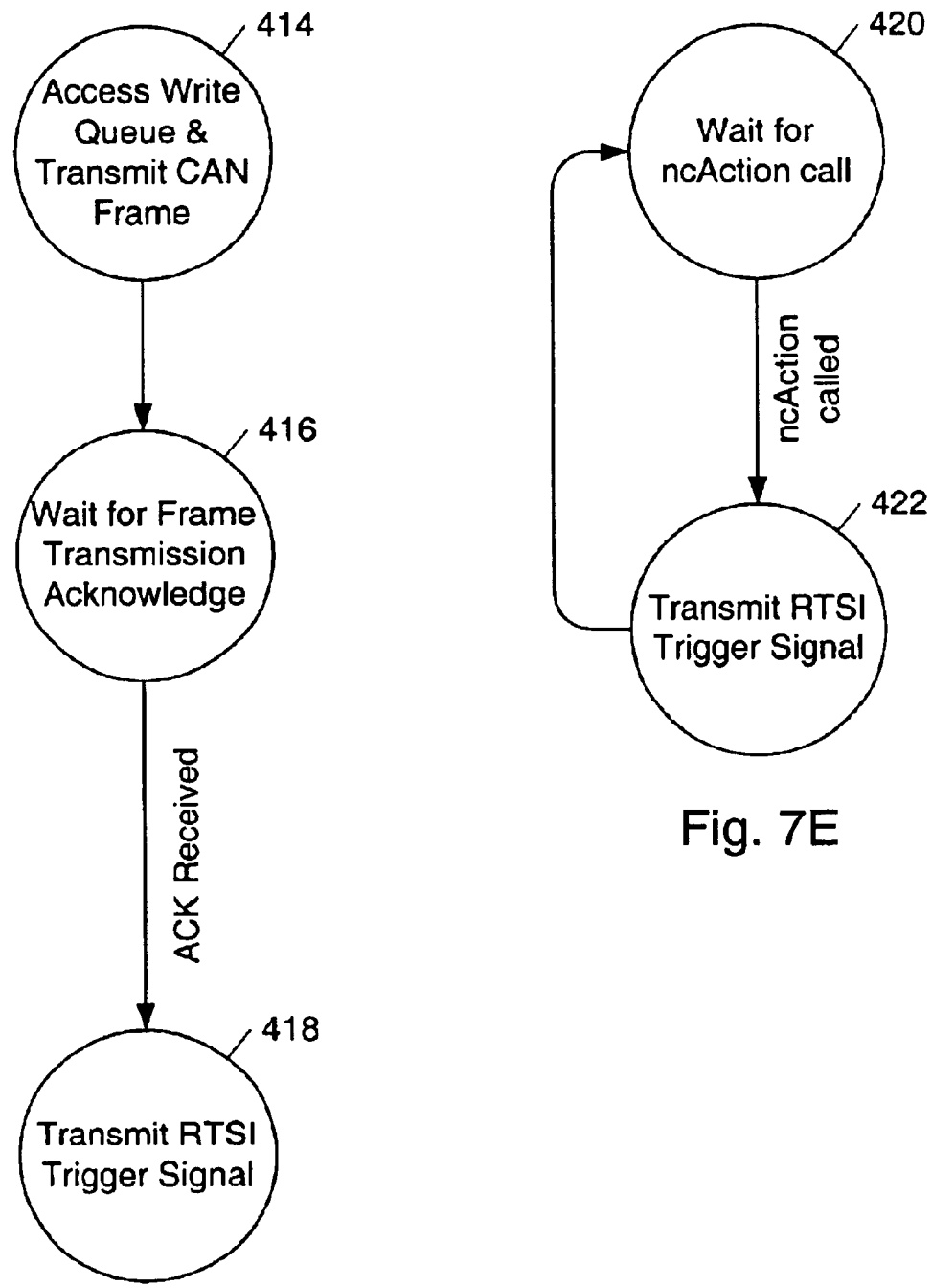
FIG. 7D illustrates an object configured to transmit a RTSI trigger signal in response to transmission of a CAN frame.
FIG. 7E illustrates an object configured to transmit a RTSI trigger signal in response to a particular function call invoked by host software.

FIG. 7D illustrates operation of an object (Network Interface or CAN Object) configured with this attribute value (5). In state 414, data bytes from the object's write queue may be accessed, and transmitted in a CAN frame onto CAN bus 112. The object may be configured to transmit a CAN frame periodically or in response to a call to the ncWrite function. After transmitting a CAN frame, the CAN interface waits for an acknowledgement from the receiving node (as indicated in state 416). When the transmitted frame is acknowledged by a receiving node, the object transitions to state 418, upon which the RTSI trigger signal is transmitted. After transmitting the RTSI trigger signal, the object may return to state 414.

(6) NC RTSI OUT ACTION ONLY

Network Interface & CAN Objects: In this mode, NI-CAN will output a RTSI trigger on the RTSI line configured via NC_ATTR_RTSI_SIGNAL whenever the user application program calls the ncAction function. With this function a user can set/toggle a RTSI line high or low.

FIG. 7E illustrates operation of an object (Network Interface or CAN Object) configured with this attribute value (6). In state 420, the object (i.e. the CAN driver routine executing on the embedded CPU 302 in response to the object's configuration) waits for an assertion of the ncAction function by the user application program. In response to the user application program calling the ncAction function, the object transitions to state 422. In state 422, the object transmits a RTSI trigger signal on a selected one of the RTSI lines. After transmitting the RTSI trigger signal, the object may return to state 420.

In addition to RTSI transmission in response to ncAction, the object may be configured to receive and/or transmit CAN frames from/to CAN bus 112.

The following attributes configure a CAN Network Interface or a CAN Object for RTSI: Attribute NC ATTR RTSI_SIGNAL (RTSI Line Number)

This attribute defines the RTSI B signal that is to be associated with a Network Interface Object or CAN Object. This attribute may be assigned any value in the range 0 through 7 to select one of 8 signal lines, i.e. to select a RTSI signal line.

In one embodiment, the RTSI interface hardware may support four RTSI lines for inputs and four RTSI lines for output. Hence, up to four CAN objects may configure RTSI lines as input, and up to four CAN objects may configure RTSI lines as output. There is no limitation which lines can be used as input or output.

Attribute NC ATTR RTSI SIG BEHAV (RTSI Behavior)

When a CAN object is used to drive a RTSI signal, this attribute determines how the RTSI trigger signal is asserted on the selected RTSI line, i.e. by pulsing the RTSI line or toggling the RTSI line. In the toggle mode, the RTSI trigger signal is asserted by flipping the state to the opposite of the previous state (high or low).

Attribute NC ATTR RTSI FRAME (UserRtsiFrame)

This attribute is to be used when a CAN object is to be configured with attribute NC_ATTR_RTSI_MODE and with attribute value of NC_RTSI_TIME_ON_IN. Since the CAN object's receiving structure contains only Timestamp and Data[8] field, a 4-byte data frame is specified and embedded in the first four bytes of the Data[8] so that host software will be able to distinguish the RTSI event from other data frames. This 4-byte user frame is configured via NC_ATTR_RTSI_FRAME attribute in the RTSI configuration for CAN object. The NC ATTR RTSI FRAME attribute may be assigned any unsigned 32 number in hex.

Attribute NC ATTR RTSI SKIP (RTSI Skip)

This attribute is used to define the number of RTSI events to skip before logging them to the read queue for that object. This attribute is to be used with NC_ATTR_RTSI_MODE and with attribute value of NC_RTSI_TIME_ON_IN. This attribute value may take any user designated value.

Event Synchronization

Peripheral device 106 may be configured to transmit and/or receive analog and/or digital data in response a RTSI trigger signal received on a selected RTSI line. In view of the RTSI configuration features of CAN objects described above, peripheral device 106 may be configured to transmit and/or receive data in precise time relationship with a CAN stimulus event corresponding to a particular object (e.g. Network Interface Object or CAN Object). CAN stimulus events include the reception of a CAN frame, the transmission of a CAN frame, and host software calls to the ncAction function.

Furthermore, peripheral device 106 may be configured to assert a RTSI trigger signal on a selected RTSI line when it receives and/or transmits data More generally, peripheral device 106 may be configured to assert a RTSI trigger signal on a selected RTSI line in response to a peripheral stimulus event. A peripheral stimulus event may be defined as any condition or combination of conditions which may induce the assertion of a RTSI trigger signal by peripheral device 106. Peripheral stimulus events include the transmission and/or reception of data (by peripheral device 106), an edge transition of a clock signal (e.g. a vertical sync signal in a video stream), the detection of a particular pattern in the transmitted or received data stream, a command asserted by host software, a signal condition that depends on the transmitted and/or received data, etc. The present invention contemplates a wide variety of possibilities for peripheral stimulus events, and the set of peripheral stimulus events depends on the exact realization of the peripheral device 106. In view of the RTSI programmability of objects discussed above, CAN interface 104 may be configured to perform CAN response events in response to peripheral stimulus events mediated by the RTSI trigger signals transmitted through RTSI bus 220. CAN response events include the generation and storage of a RTSI timestamp, and the transmission and/or reception of a CAN frame.

Figure 8A:
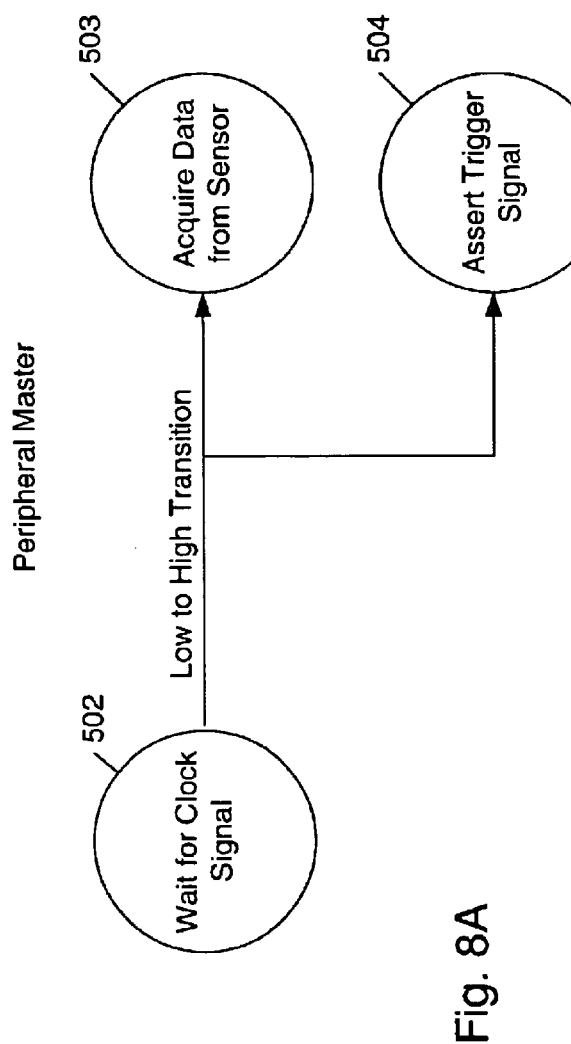
FIGS. 8A and 8B illustrate a first configuration of the computer-based control system 100, wherein CAN interface 104 generates and stores a RTSI timestamp in response to the acquisition of data by peripheral device 106.

FIGS. 8A/8B—Correlating Peripheral Acquisition and CAN Reception

Figure 8B:
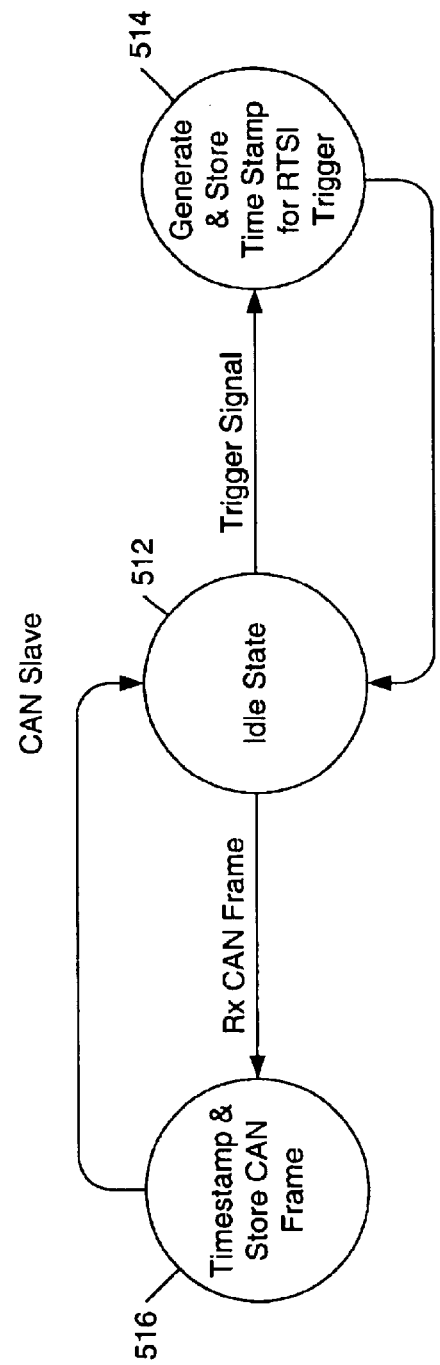

FIGS. 8A and 8B illustrates a first configuration of computer-based control system 100. Peripheral device 106 is configured as a master of a particular RTSI line, and CAN interface 104 is configured with an object (Network Interface Object or CAN Object) which is a slave with respect to the same RTSI line. As shown in FIG. 8A, in state 502, peripheral device 106 (e.g. a data acquisition device) may wait for a data acquisition condition to become true. For example, peripheral device 106 may wait for an edge transition of a scan clock. On receiving a rising edge, peripheral device 106 may acquire data from sensor 114 (as indicated in state 503), and may assert a RTSI trigger signal to the CAN device 104 through the selected RTSI line (as indicated in state 504). In addition, peripheral device 106 may timestamp the acquired data. This timestamp may be referred to as a peripheral data timestamp. After the processing associated with step 504 is complete, peripheral device 106 may return to state 502.

FIG. 8B illustrates the operation of CAN interface 104 in response to a particular object (e.g. Network Interface Object or CAN Object). In state 512, CAN interface 104 may be idle at least so far as this object is concerned. (It may be busily engaged in performing processing associated with other objects). In response to receiving a RTSI trigger generated by peripheral device 106 on the designated RTSI line, CAN interface 104 transitions to state 514. In state 514, CAN interface 104 generates a timestamp in response to the RTSI trigger which defines the time-of-occurrence of the RTSI trigger. The timestamp may be stored in the object's read queue. After storing the RTSI time-stamp, CAN interface 104 may return to idle state 512.

Ad In response to receiving a CAN frame from CAN bus 112, CAN interface 104 may transition to state 516. In state 516, CAN interface 104 may generate a CAN time-stamp for the CAN frame. The CAN timestamp and CAN frame may be stored in the object's read queue (which comprises a portion of RAM in CAN interface 104). After storing the CAN timestamp and CAN frame, CAN interface 104 may return to idle state 512.

In this first configuration, CAN interface 104 generates a RTSI timestamp in response to a data acquisition by peripheral device 106. The RTSI timestamps may be used in any of a variety of ways by host software and/or by software routines running on embedded CPU 302.

Host software executing on the host CPU 202 may be operable to access the read queue of the CAN object (e.g. using the ncRead function) and the input buffer of the peripheral device 106, and to correlate each received CAN frame with the closest data point (or data set) acquired by the peripheral device 106. This correlation may be accomplished using the peripheral data timestamps, the RTSI timestamps and the CAN timestamps stored in states 504, 514 and 516 respectively. Host software may utilize the CAN timestamp of a CAN frame to correlate this CAN frame with the various RTSI timestamps of the RTSI triggers to determine the closest data point acquired by peripheral device 106 relative to the CAN frame. This may be used by the host application software in performing various analysis functions and/or control functions with respect to physical system 120.

FIGS. 9A/9B—Correlating Peripheral Transmission and CAN Reception

FIGS. 9A and 9B illustrate a second configuration of computer-based control system 100. Again peripheral device 106 is configured as a master of a particular RTSI line, and CAN interface 104 is configured with an object (Network Interface Object or CAN Object) which is a slave with respect to the same RTSI line. As shown in FIG. 9A, in state 602, peripheral device 106 (e.g. a data acquisition device) may wait for a transmission condition to become true. For example, peripheral device 106 may wait for an edge transition of an update clock, a command from host software, a request from an external device, etc. On receiving a rising edge, peripheral device 106 may transmit data to actuator 114 (as indicated in state 603), and may assert a RTSI trigger signal to the CAN interface 104 through the selected RTSI line (as indicated in state 604). In addition, peripheral device 106 may timestamp the transmission. This timestamp may be referred to as a peripheral transmit timestamp. After the processing associated with step 604 is complete, peripheral device 106 may return to state 602.

FIG. 9B is identical to FIG. 8B, and is repeated for the sake of reader convenience in understanding this second configuration. See the text attending FIG. 8B for a description of FIG. 9B.

In this second configuration, CAN interface 104 generates a RTSI timestamp in response to a data transmission by peripheral device 106. The RTSI timestamps may be used in any of a variety of ways by host software and/or by software routines running on embedded CPU 302.

Host software executing on the host CPU 202 may be operable to access the read queue of the CAN object (e.g. using the ncRead function) and the memory of peripheral device 106, and to correlate each received CAN frame with the closest data set transmitted by peripheral device 106. This correlation may be accomplished using the peripheral transmit timestamps, the RTSI timestamps and the CAN timestamps stored in states 604, 514 and 516 respectively. Host software may utilize the CAN timestamp of a CAN frame to correlate this CAN frame with the various RTSI timestamps of the RTSI triggers to determine the closest data point transmitted by peripheral device 106 relative to the CAN frame. This information may be used by the host application software in performing various analysis functions and/or control functions with respect to physical system 120.

Figure 10A:
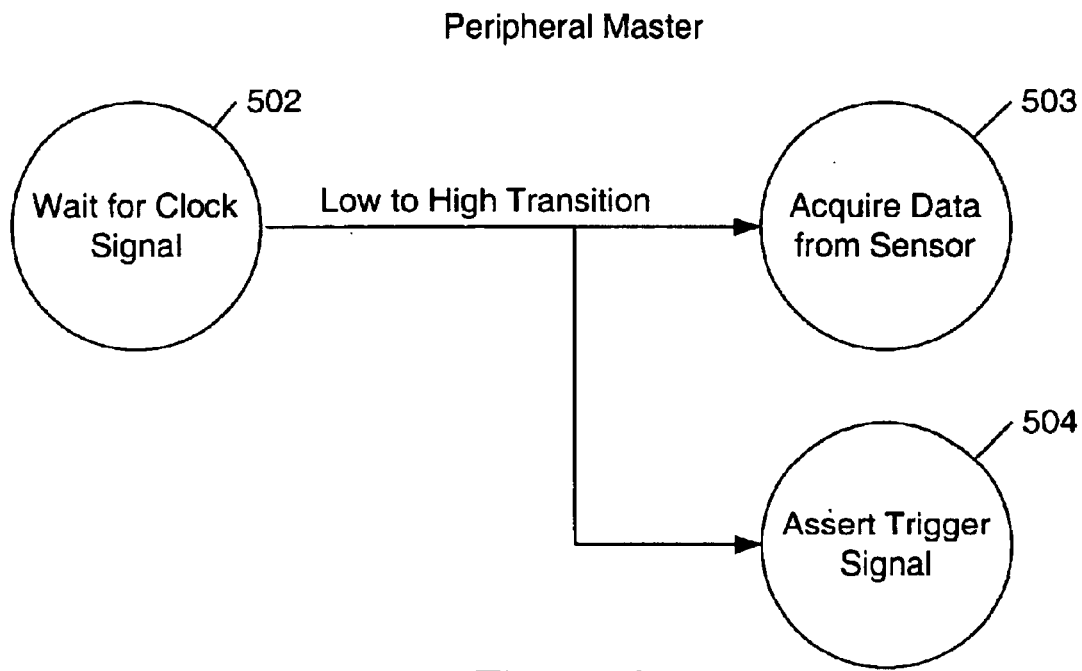
FIGS. 10A and 10B illustrate a third configuration of the computer-based control system 100, wherein CAN interface 104 transmits a CAN frame in response to the acquisition of data by peripheral device 106.

FIGS. 10A/10B—Peripheral Acquisition Induces CAN Transmit

Figure 10B:
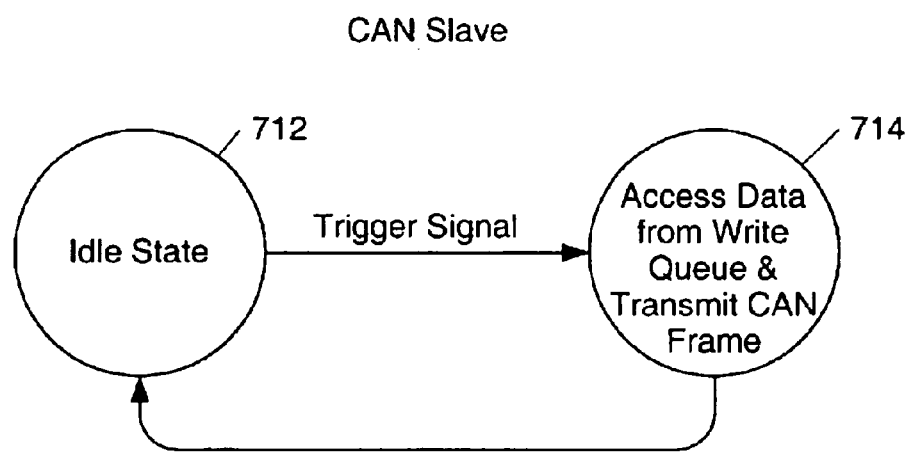

FIGS. 10A and 10B illustrate a third configuration of computer-based control system 100. Again, peripheral device 106 is configured as a master of a particular RTSI line, and CAN interface 104 is configured with an object (Network Interface Object or CAN Object) which is a slave with respect to the same RTSI line.

FIG. 10A is identical FIG. 8A and is repeated for the sake of reader convenience in understanding this third configuration. See the text attending FIG. 8A above for a description of FIG. 10A.

FIG. 10B illustrates the operation of CAN interface 104 in response to a particular object (e.g. Network Interface Object or CAN Object). In state 712, CAN interface 104 may be idle at least so far as this object is concerned. (It may be busily engaged in performing processing associated with other objects). In response to receiving a RTSI trigger generated by peripheral device 106 on the designated RTSI line, CAN interface 104 transitions to state 714. In state 714, CAN interface 104 accesses data bytes from the object's write queue and transmits a CAN frame containing the data bytes onto CAN bus 112. After transmitting the CAN frame, CAN interface 104 may return to idle state 712.

Observe that this third configuration allows CAN interface 102 to transmit CAN frames in precise time synchronization with a data acquisition performed by the peripheral device 106.

Figure 11A:
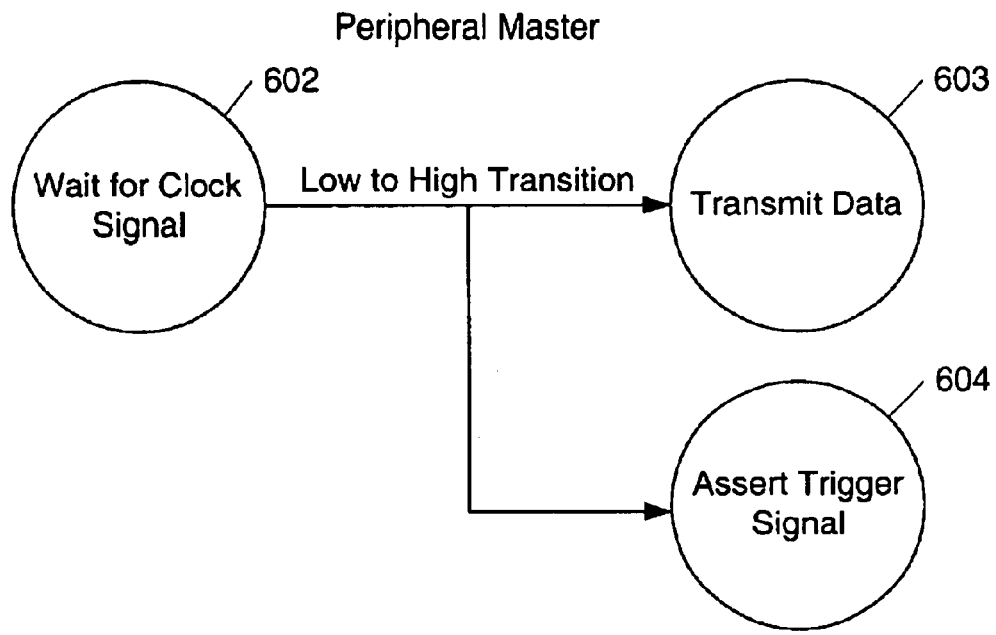
FIGS. 11A and 11B illustrate a fourth configuration of the computer-based control system 100, wherein CAN interface 104 transmits a CAN frame in response to the transmission of data by peripheral device 106.

FIGS. 11A/11B—Peripheral Acquisition Induces CAN Transmit

Figure 11B:
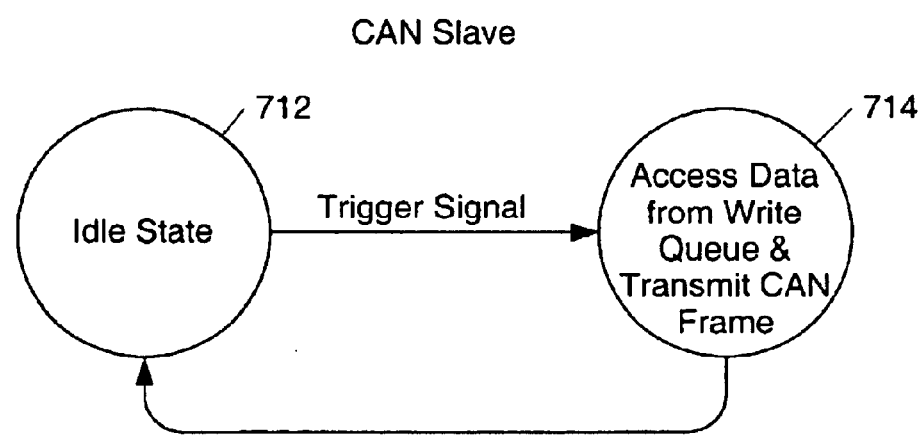

FIGS. 11A and 11B illustrate a fourth configuration of computer-based control system 100. Again, peripheral device 106 is configured as a master of a particular RTSI line, and CAN interface 104 is configured with an object (Network Interface Object or CAN Object) which is a slave with respect to the same RTSI line.

FIG. 11A is identical FIG. 9A and is repeated for the sake of reader convenience in understanding this fourth configuration. See the text attending FIG. 9A above for a description of FIG. 11A.

FIG. 11B is identical to FIG. 10B, and is repeated for the sake of reader convenience in understanding this fourth configuration. See text attending FIG. 10B above for a description of FIG. 11B.

Observe that this fourth configuration allows CAN interface 102 to transmit CAN frames in precise time synchronization with a data transmission performed by the peripheral device 106.

Figure 12A:
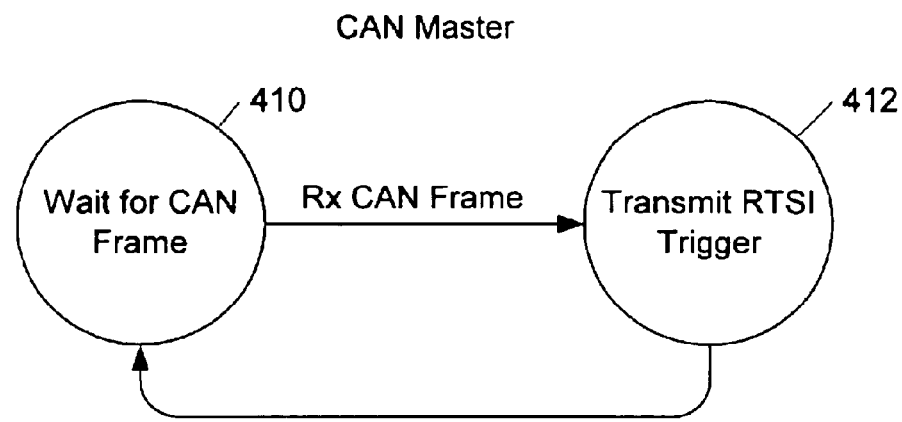
FIGS. 12A and 12B illustrate a fifth configuration of the computer-based control system 100, wherein peripheral device 106 performs a data transfer in response to the reception of a CAN frame by CAN interface 104.

FIGS. 12A/12B—Peripheral Transfer in Response to CAN Reception

Figure 12B:
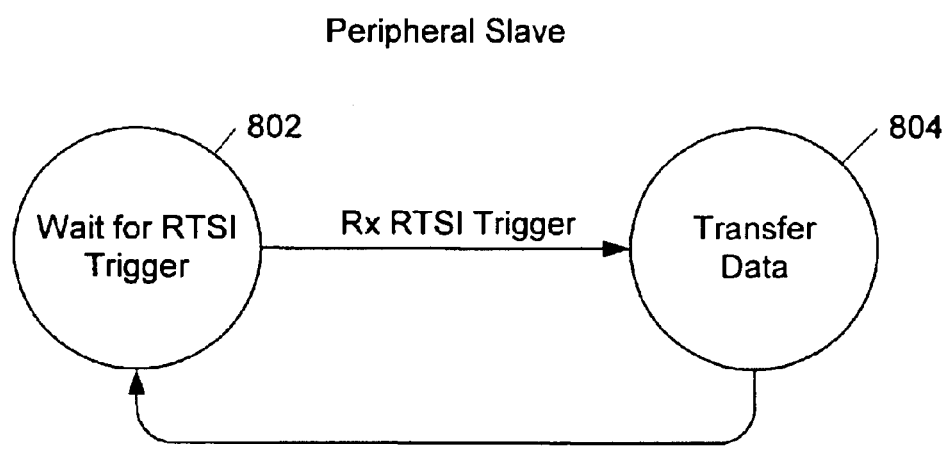

FIGS. 12A and 12B illustrate a fifth configuration of computer-based control system 100. CAN interface 104 is configured with an object (Network Interface Object or CAN Object) which is a master with respect to a particular RTSI line, and peripheral device 106 is configured as a slave of that RTSI line.

FIG. 12A illustrates the operation of CAN interface 104 in response to a particular object (e.g. Network Interface Object or CAN Object). FIG. 12A is identical to FIG. 7C, and is repeated here for the sake of reader convenience. In state 410, CAN interface 104 may wait for the reception of a CAN frame from CAN bus 112. In response to receiving a CAN frame from CAN bus 112, CAN interface 104 transitions to state 412. In state 412, CAN interface 104 asserts a RTSI trigger signal on the designated RTSI line (i.e. the particular RTSI line for which peripheral device 106 is configured as slave). After asserting the RTSI trigger signal, CAN interface 104 may return to state 410.

FIG. 12B illustrates the operation of peripheral device 106 according this fifth configuration. In state 802, peripheral device 106 waits for an assertion of the RTSI trigger signal on the designated RTSI line. In response to the receiving the RTSI trigger signal, peripheral device 106 may perform a data transfer (or more generally, a signal transfer) such as a data acquisition and/or a data transmission. For example, peripheral device 106 may transmit data and/or signals to actuator 114. In another example, peripheral device 106 may capture a data stream (e.g. a video stream) generated by sensor 114, and store the data stream in a memory buffer.

Thus, in this fifth configuration, peripheral device 106 may perform a data transfer in response to (and in precise time synchronization with respect to) a CAN frame reception by CAN interface 104. The synchronization of the peripheral data transfer and the CAN frame reception is mediated by the transfer of a RTSI trigger signal through the RTSI bus 220.

Figure 13A:
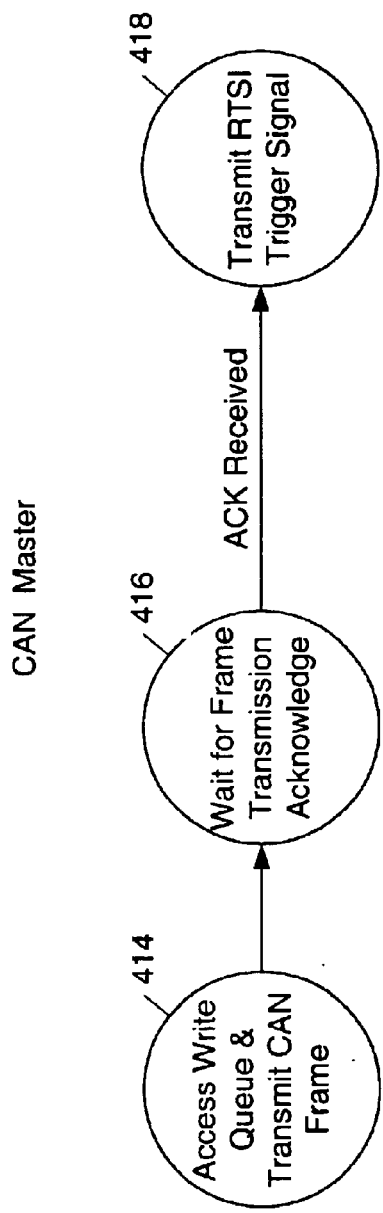
FIGS. 13A and 13B illustrate a sixth configuration of the computer-based control system 100, wherein peripheral device 106 performs a data transfer in response to the transmission of a CAN frame by CAN interface 104.

FIGS. 13A/13B—Peripheral Transfer in Response to CAN Transmission

Figure 13B:
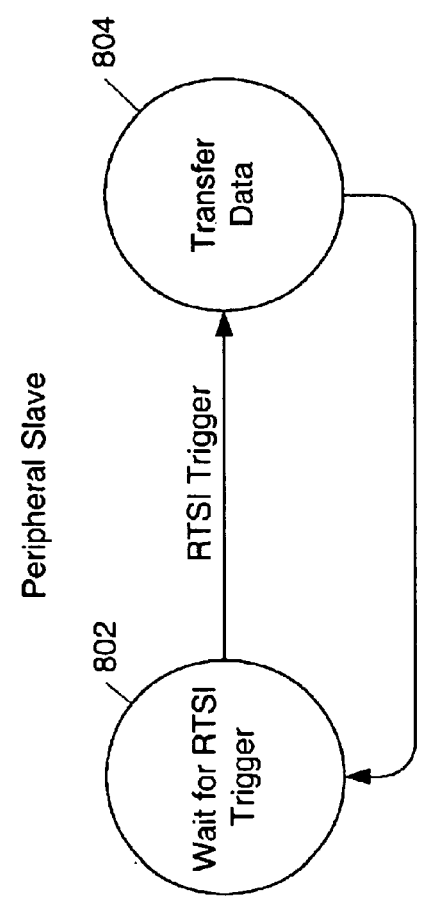

FIGS. 13A and 13B illustrate a sixth configuration of computer-based control system 100. CAN interface 104 is configured with an object (Network Interface Object or CAN Object) which is a master with respect to a particular RTSI line, and peripheral device 106 is configured as a slave of that RTSI line.

FIG. 13A is identical to FIG. 7D, and is repeated here for reader convenience in understanding this sixth configuration. See text attending FIG. 7D for a description of FIG. 13A.

FIG. 13B is identical to FIG. 12B, and is repeated here for reader convenience in understanding this sixth configuration. See text attending FIG. 12B for a description of FIG. 13B.

In this sixth configuration, peripheral device 106 may perform a data transfer in response to (and in precise time synchronization with respect to) a CAN frame transmission by CAN interface 104.

Figure 14A:
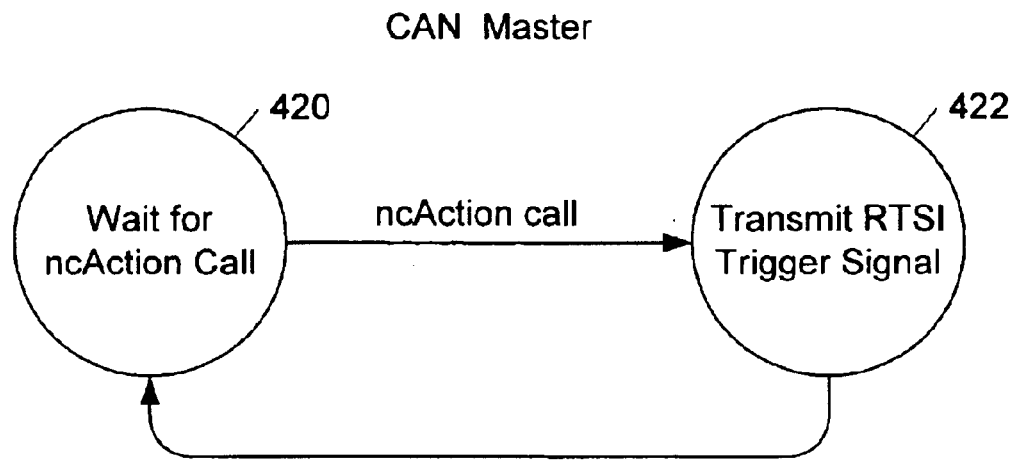
FIGS. 14A and 14B illustrate a seventh configuration of the computer-based control system 100, wherein peripheral device 106 performs a data transfer in response to a RTSI trigger signal asserted by CAN interface 104, wherein CAN interface asserts the RTSI trigger signal in response to a particular function call asserted by host software.

FIGS. 14A/14B—Peripheral Transfer in Response to CAN Function Call

Figure 14B:
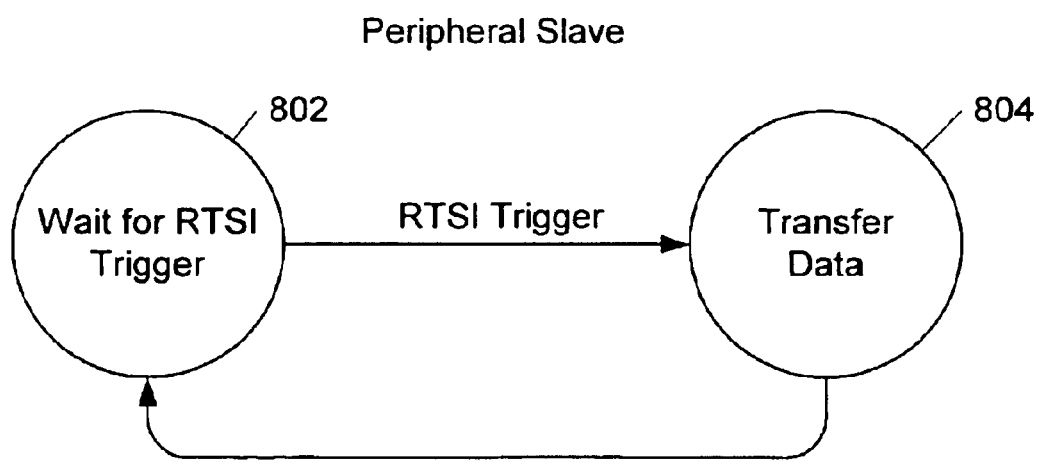

FIGS. 14A and 14B illustrate a seventh configuration of computer-based control system 100. CAN interface 104 is configured with an object (Network Interface Object or CAN Object) which is a master with respect to a particular RTSI line, and peripheral device 106 is configured as a slave of that RTSI line.

FIG. 14A is identical to FIG. 7E, and is repeated here for reader convenience in understanding this seventh configuration. See text attending FIG. 7E for a description of FIG. 14A.

FIG. 14B is identical to FIG. 12B, and is repeated here for reader convenience in understanding this seventh configuration. See text attending FIG. 12B for a description of FIG. 14B.

In this seventh configuration, peripheral device 106 may perform a data transfer in response to a call of the ncAction function by the user application program mediated by the transmission of the RTSI trigger signal through the RTSI bus 220.

In an eighth configuration of computer-based control system 100, the peripheral device may be configured to transfer data values (or, more generally, signals) to and/or from physical system 120 via sensor/actuators 114. The peripheral device may generate peripheral timestamps indicating times-of-transference of the data values. The peripheral device may store the peripheral timestamps in a memory (e.g. a memory resident within the peripheral device). As described above, the CAN interface may be configured to perform a CAN frame transfer, and to transmit a trigger signal onto the interconnecting bus to the peripheral device in response to the CAN frame transfer.

In response to receiving the trigger signal, the peripheral device may generate a trigger timestamp indicating a time-of-occurrence of the trigger signal. The peripheral device (or the host computer) may use the peripheral timestamps and the trigger timestamp to determine one or more of the data values which correlate in time with the CAN frame transfer. For example, a user application program running on the host computer may read the trigger timestamp and the peripheral timestamps from the peripheral device, and correlate the trigger timestamp to the peripheral timestamps.

The operation of transferring data values performed by the peripheral device may comprise acquiring data values from the physical system, and/or transmitting data values to the physical system. Similarly, the CAN frame transfer performed by the CAN interface may comprise receiving a CAN frame from the CAN bus and/or transmitting a CAN frame onto the CAN bus. The interconnecting bus may comprise the Real-Time System Integration (RTSI) bus.

VARIOUS EXAMPLES

In one embodiment, sensor 114 comprises a video camera and peripheral device 106 comprises a image acquisition board. Thus, in view of the RTSI programmability of CAN objects in CAN interface 102, video data acquisition may be performed in response to CAN events (e.g. CAN frame transmission, CAN frame transmission, CAN function calls, etc.) occurring in the CAN network. Conversely, CAN events may be performed in response to the acquisition of video data in the image acquisition board.

In a second embodiment, sensor 114 comprises a motion detection device and peripheral device 106 comprises a motion board. Thus, CAN events may be performed in response to the detection of motion, and vice versa.

In a third embodiment, peripheral device 106 comprises a waveform generator configured to transmit a digital and/or analog waveform to actuator 114. Thus, CAN events may be generated in response to the transmission of a waveform by the waveform generator, and vice versa. For example, in order to test a CAN sensor (i.e. one of CAN devices 116), CAN interface 104 may be configured to receive a CAN frame from the CAN sensor in response to a waveform generated by the waveform generator.

In a fourth embodiment, peripheral device 106 comprises a data acquisition board configured to receive digital and/or analog signals from sensor 114. Thus, data acquisition board may be configured to acquire data from sensor 114 in response to CAN events, and vice versa. For example, in order to test a CAN actuator (i.e. one of CAN devices 116), CAN interface 104 may be configured to transmit a CAN frame to the CAN sensor, and to assert a RTSI trigger informing the data acquisition device of the CAN transmission. Data acquisition device may responsively acquire data from sensor 114.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for synchronizing a Controller Area Network (CAN) interface with a peripheral device, the system comprising:

a peripheral device, coupled to a host computer via an I/O bus;

a CAN interface, coupled to the host computer via the I/O bus, wherein the CAN interface comprises:
  a memory configured to store program code;
  an embedded processor coupled to the memory, and configured to execute the program code;
  bus interface logic coupled to the embedded processor; and
  CAN interface logic coupled to the embedded processor and configured for interfacing with a CAN bus; and an interconnecting bus, coupling the peripheral device to the CAN interface via the bus interface logic of the CAN interface, wherein the peripheral device is operable to generate an asynchronous trigger on the interconnecting bus in response to a peripheral event;

wherein the CAN interface is operable to receive the asynchronous trigger via the interconnecting bus;

wherein the embedded processor is operable to execute the program code to perform a CAN event in response to said CAN interface receiving the asynchronous trigger on the interconnecting bus from the peripheral device, wherein the CAN event is performed substantially synchronously with the peripheral event; and wherein the generation and receipt of the asynchronous trigger, and the performing the CAN event are performed independently of the I/O bus.

2. The system of claim 1, wherein the CAN event comprises transmission of a CAN frame onto the CAN bus.

3. The system of claim 1, wherein the CAN event comprises generating a timestamp defining a time-of-occurrence of the asynchronous trigger and storing the timestamp in said memory.

4. The system of claim 1, wherein the bus interface logic is operable to receive the asynchronous trigger on a first line of a plurality of lines on the interconnecting bus;

wherein the embedded processor is operable to receive configuration information from the host computer, wherein the configuration information selects the first line among a plurality of lines of said interconnecting bus.

5. The system of claim 1, wherein the interconnecting bus is the Real-Time System Integration (RTSI) bus.

6. A system for synchronizing a Controller Area Network (CAN) interface with a peripheral device, the system comprising:

a peripheral device, coupled to a host computer via an I/O bus;

a CAN interface, coupled to the host computer via the I/O bus, wherein the CAN interface comprises:
  a memory configured to store program code;
  an embedded processor coupled to the memory, and configured to execute the program code;
  bus interface logic coupled to the embedded processor; and
  CAN interface logic coupled to the embedded processor and adapted for interfacing with a CAN bus; and an interconnecting bus, coupling the peripheral device to the CAN interface via the bus interface logic of the CAN interface;

wherein the CAN interface is operable to generate an asynchronous trigger on the interconnecting bus in response to a CAN event;

wherein the peripheral device is operable to receive the asynchronous trigger via the interconnecting bus;

wherein the bus interface logic of the CAN interface is configured to assert the asynchronous trigger on the interconnecting bus to the peripheral device in response to the embedded processor performing a CAN event, wherein the peripheral device is operable to perform a peripheral event substantially synchronously with the CAN event upon receiving the asynchronous trigger on the interconnecting bus from the CAN interface; and wherein the generation and receipt of the asynchronous trigger, and the performing the peripheral event are performed independently of the I/O bus.

7. The system of claim 6, wherein the CAN event comprises transmission of a CAN frame.

8. The system of claim 6, wherein the CAN event comprises reception of a CAN frame.

9. The system of claim 6, wherein the CAN event comprises receiving an indication of a function call invoked by a user application program running on the host computer.

10. The system of claim 6, wherein the embedded processor is operable to receive configuration information from the host computer, wherein the configuration information selects a first line among a plurality of lines of said interconnecting bus for transmission of the asynchronous trigger.

11. The system of claim 6 wherein the interconnecting bus is a Real-Time System Integration (RTSI) bus.

12. A method for synchronizing a Controller Area Network (CAN) interface with a peripheral device, wherein the CAN interface and the peripheral device are both coupled to a host computer via an I/O bus, wherein the CAN interface and the peripheral device are directly coupled through an interconnecting bus, the method comprising:
the peripheral device generating an asynchronous trigger on the interconnecting bus in response to a peripheral event;
the CAN interface receiving the asynchronous trigger from the peripheral device through the interconnecting bus; and
the CAN interface performing a CAN event in response to the asynchronous trigger;
wherein, in response to receiving the asynchronous trigger, the CAN interface performs the CAN event substantially synchronously with the peripheral event; and
wherein the generation and receipt of the asynchronous trigger, and the performing the CAN event are performed independently of the I/O bus.

13. The method of claim 12, wherein the CAN event comprises transmission of a CAN frame onto a CAN bus which couples to the CAN interface.

14. The method of claim 12, wherein the CAN event comprises generating a timestamp defining a time-of-occurrence of the asynchronous trigger, and storing the timestamp in a memory of the CAN interface.

15. The method of claim 12, wherein the interconnecting bus is the Real-Time System Integration (RTSI) bus.

16. The method of claim 12, wherein the peripheral device transmits the asynchronous trigger so in response to performing a data transfer.

17. A method for synchronizing a Controller Area Network (CAN) interface with a peripheral device, wherein the CAN interface and the peripheral device are both coupled to a host computer using an I/O bus, wherein the CAN interface and the peripheral device are directly coupled through an interconnecting bus, the method comprising:
the CAN interface performing a CAN event; and
the CAN interface transmitting an asynchronous trigger to the peripheral device through the interconnecting bus in response to the CAN interface performing the CAN event;
wherein the asynchronous trigger is operable to direct the peripheral device to perform a peripheral event substantially synchronously with the CAN event in response to the asynchronous trigger; and
wherein the transmission of the asynchronous trigger and the performing each of the CAN event and the peripheral event are performed independently of the I/O bus.

18. The method of claim 17, wherein the CAN event comprises transmission of a CAN frame.

19. The method of claim 17, wherein the CAN event comprises reception of a CAN frame.

20. The method of claim 17, wherein the CAN event comprises receiving an indication of a function call invoked by a user application program running on the host computer.

21. The method of claim 17, wherein the interconnecting bus is a Real-Time System Integration (RTSI) bus.

22. A system for synchronizing a Controller Area Network (CAN) interface device with a peripheral device, the system comprising:
a host computer system;
a peripheral device coupled to the host computer system via an I/O bus, wherein the peripheral device couples to the physical system;
a Controller Area Network (CAN) bus;
one or more CAN devices coupled to the CAN bus, wherein the one or more CAN devices couple to the physical system;
a CAN interface device coupled to the host computer system via the I/O bus; and
an interconnecting bus, coupling the peripheral device to the CAN interface device;
wherein the CAN interface device and the peripheral device are operable to communicate with each other using the interconnecting bus to synchronize measurement and/or control operations on the physical system, wherein said communicating is performed independently of the I/O bus;
wherein said communicating with each other comprises using an asynchronous trigger signal.

23. The system of claim 22,
wherein the CAN interface device includes:
bus interface logic for interfacing with the interconnecting bus;
CAN interface logic configured to interface with the CAN bus.

24. The system of claim 22,
wherein the peripheral device is operable to provide the asynchronous trigger signal over the interconnecting bus to the CAN interface device in response to a peripheral event occurring in the peripheral device;
wherein the CAN interface device is operable to receive the asynchronous trigger signal from the interconnecting bus, and to perform a CAN event in response to receiving the asynchronous trigger signal.

25. The system of claim 24, wherein the peripheral event comprises one or more of: initiation of a signal transmission from the peripheral device to the physical system; and acquisition of a signal from the physical system.

26. The system of claim 24, wherein the CAN event comprises one or more of: transmitting a CAN frame to one or more of the CAN devices; or generating a signal timestamp indicating a time-of-occurrence of the signal.

27. The system of claim 22,
wherein the CAN interface device is operable to provide the asynchronous trigger signal over the interconnecting bus to the peripheral device in response to a CAN event occurring in the CAN interface device;
wherein the peripheral device is operable to receive the asynchronous trigger signal from the interconnecting bus, and to perform a peripheral event in response to receiving the asynchronous trigger signal.

28. The system of claim 22, wherein the interconnecting bus is the Real-Time System Integration (RTSI) bus.

29. A method for correlating measurements in a system comprising a host computer system coupled to a Controller Area Network (CAN) interface and a peripheral device via an I/O bus, wherein the CAN interface is adapted to couple through a CAN bus to one or more CAN devices, wherein the CAN devices couple to a physical system, wherein the peripheral device is also adapted to couple to the physical system, wherein the peripheral device and the CAN interface are directly coupled through an interconnecting bus, the method comprising:

the CAN interface acquiring CAN data frames from the CAN bus;

the CAN interface generating CAN timestamps for the acquired CAN data frames;

the peripheral device transmitting an asynchronous trigger signal on the interconnecting bus to the CAN interface in response to a peripheral event performed by the peripheral device;

the CAN interface receiving the asynchronous trigger signal and generating a trigger timestamp for the asynchronous trigger signal; and determining from the CAN timestamps and the trigger timestamps one or more of the CAN data frames which correlate in time with the peripheral event;

wherein the transmission and receipt of the asynchronous trigger signal and the performing the peripheral event are performed independently of the I/O bus.

30. The method of claim 29, further comprising:

analyzing the physical system using the CAN data frames which correlate in time with the peripheral event.

31. The method of claim 29, wherein said determining is performed by the CAN interface.

32. The method of claim 29, further comprising the host computer system reading the CAN data frames, CAN timestamps and trigger timestamps, wherein said determining one or more CAN data frames which correlate in time with the peripheral event is performed by the host computer system.

33. The method of claim 29, wherein the peripheral event comprises one of: the peripheral device transmitting signals to the physical system; the peripheral device acquiring signals from the physical system; a clock signal transition.

34. The method of claim 29, wherein the interconnecting bus is the Real-Time System Integration (RTSI) bus.

35. A method for correlating measurements in a system comprising a host computer system coupled to a Controller Area Network (CAN) interface and a peripheral device using an I/O bus, wherein the CAN interface is adapted to couple through a CAN bus to one or more CAN devices, wherein the CAN devices couple to a physical system, wherein the peripheral device is also adapted to couple to the physical system, wherein the peripheral device and the CAN interface are directly coupled through an interconnecting bus, the method comprising:

the peripheral device transferring data values;

the peripheral device generating peripheral timestamps indicating times-of-transference of said data values;

the CAN interface performing a CAN frame transfer;

the CAN interface transmitting an asynchronous trigger signal on the interconnecting bus to the peripheral device in response to the CAN frame transfer;

the peripheral device receiving the trigger signal and generating a trigger timestamp indicating a time-of-occurrence of the asynchronous trigger signal; and determining from the peripheral timestamps and the trigger timestamp one or more of the data values which correlate in time with the CAN frame transfer;

wherein the transmission and receipt of the asynchronous trigger signal are performed independently of the I/O bus.

36. The method of claim 35, wherein said peripheral device transferring data values comprises said peripheral device acquiring said data values from the physical system.

37. The method of claim 35, wherein said peripheral device transferring data value comprises said peripheral device transmitting said data value to the physical system.

38. The method of claim 35, wherein said CAN interface performing a CAN frame transfer comprises said CAN interface receiving a CAN frame from the CAN bus.

39. The method of claim 35, wherein said CAN interface performing a CAN frame transfer comprises said CAN interface transmitting a CAN frame onto the CAN bus.

40. The method of claim 35, wherein the interconnecting bus comprises the Real-Time System Integration (RTSI) bus.

41. The system of claim 1, wherein the I/O bus comprises one or more of:

an ISA bus; and a PCI expansion bus.

42. The system of claim 6, wherein the I/O bus comprises one or more of:

an ISA bus; and a PCI expansion bus.

43. The method of claim 12, wherein the I/O bus comprises one or more of:

an ISA bus; and a PCI expansion bus.

44. The method of claim 17, wherein the I/O bus comprises one or more of:

an ISA bus; and a PCI expansion bus.

45. The system of claim 22, wherein the I/O bus comprises one or more of:

an ISA bus; and a PCI expansion bus.

46. The method of claim 29, wherein the I/O bus comprises one or more of:

an ISA bus; and a PCI expansion bus.

47. The method of claim 35, wherein the I/O bus comprises one or more of:

an ISA bus; and a PCI expansion bus.

* * * * *